United States Patent
Šopík et al.

(10) Patent No.: US 11,831,672 B2
(45) Date of Patent: Nov. 28, 2023

(54) MALWARE DETECTION AND MITIGATION SYSTEM AND METHOD

(71) Applicant: Avast Software s.r.o., Prague (CZ)

(72) Inventors: Břetislav Šopík, Prague (CZ); Fabrizio Biondi, Granarolo dell'Emilia (IT); Jakub Křoustek, Rajhrad (CZ); Olga Petrova, Vrsovice (CZ)

(73) Assignee: Avast Software s.r.o., Prague (CZ)

( * ) Notice: Subject to any disclaimer, the term of this patent is extended or adjusted under 35 U.S.C. 154(b) by 234 days.

(21) Appl. No.: 17/512,015

(22) Filed: Oct. 27, 2021

(65) Prior Publication Data

US 2023/0131525 A1    Apr. 27, 2023

(51) Int. Cl.
    *H04L 9/40*    (2022.01)
(52) U.S. Cl.
    CPC ........ H04L 63/145 (2013.01); H04L 63/1408 (2013.01); H04L 63/205 (2013.01)
(58) Field of Classification Search
    CPC . H04L 63/145; H04L 63/1408; H04L 63/205; H04L 63/20; H04L 63/1425; G06F 21/50
    See application file for complete search history.

(56) References Cited

U.S. PATENT DOCUMENTS

| 8,224,761 | B1 * | 7/2012 | Rockwood | H04L 63/0263 709/224 |
| 2018/0083987 | A1 * | 3/2018 | Kislitsin | H04L 63/1408 |
| 2020/0186569 | A1 * | 6/2020 | Milazzo | H04L 63/08 |
| 2020/0213359 | A1 * | 7/2020 | Arbel | H04L 63/20 |
| 2020/0272741 | A1 * | 8/2020 | Bhatia | G06F 40/284 |

OTHER PUBLICATIONS

Břetislav Šopík, Fabrizio Biondi, Jakub Křoustek, Olga Petrova, Data File Behavioral Feature Reporting Methodology Flow Diagram, Avast Software s.r.o., Prague, Czech Republic, Jan. 2, 2020.

* cited by examiner

*Primary Examiner* — Ali S Abyaneh
(74) *Attorney, Agent, or Firm* — Dovas Law, P.C.

(57) ABSTRACT

A method and system for updating and applying a ruleset used for determining and mitigating malware threats. Communications of computing devices are monitored and first data file extracted. A first and second set of features are extracted. A first rule is applied to the first set of features of the first data file to determine a non-match. A second rule is applied to the second set of features to determine a match. A third rule is generated based on the first set of features, non-match, and match. Communications of a particular computing device are monitored and second data file extracted. A first set of features of the second data file are extracted. The third rule is applied to the first set of features of the second data file to determine a match. The second data file is disabled, blocked, or deleted based the match determination by the third rule.

41 Claims, 12 Drawing Sheets

MALWARE DETECTION AND MITIGATION SYSTEM AND METHOD

FIELD OF INVENTION

The invention relates generally to malware detection, and more particularly to malware detection rules.

BACKGROUND

In the malware industry, rules are generated and updated for the purpose of identifying and mitigating malware threats. YARA ("Yet Another Recursive/Ridiculous Acronym") rules for instance are a popular format for storing malware threat intelligence in a form that is both understandable by humans and actionable by artificial intelligence ("AI") systems. YARA rules can utilize various types of features, the two most important classes of which are static and dynamic features. The discriminating power, costs and ease of obtaining of these two types of features differ significantly. Therefore, it is a common practice to cover each malware strain by an ensemble of multiple YARA rules, or alternatively other rule protocol, where every rule utilizes only one type of the features (i.e., static or dynamic). This increases the total versatility of a ruleset. It is of crucial importance for an entity managing a particular ruleset to keep the ruleset fit by updating. As new variants of a particular malware strain appear, current rules of a ruleset become obsolete and need to be updated.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of updating and applying a ruleset used for determining and mitigating malware threats is provided in which network communications of one or more computing devices are monitored. A first data file is extracted based on the monitoring of the network communications of the one or more computing devices. At least a first set of features of the first data file and a second set of features of the first data file are extracted. A first rule is applied to the first set of features of the first data file to determine a non-match by the first rule to the first set of features of the first data file. A second rule is applied to the second set of features of the first data file to determine a match by the second rule to the second set of features of the first data file. A third rule is generated based at least on the first set of features of the first data file, the determination of the non-match by the first rule to the first set of features of the first data file, and the determination of the match by the second rule to the second set of features of the first data file. Network communications of a particular computing device are monitored. A second data file is extracted based on the monitoring of the network communications of the particular computing device. At least a first set of features of the second data file are extracted. The third rule is applied to the first set of features of the second data file to determine a match by the third rule to the first set of features of the second data file. The second data file is one or more of disabled, blocked, or deleted via the particular computing device based on the determination of the match by the third rule to the first set of features of the second data file.

A further method of updating and applying a ruleset used for determining and mitigating malware threats is provided in which network communications of one or more computing devices are monitored. A first data file is extracted based on the monitoring of the network communications of the one or more computing devices. At least a first set of features of the first data file and a second set of features of the first data file are extracted. A particular non-match to the first set of features of the first data file is determined. A particular match to the second set of features of the first data file is determined. Network communications of a particular computing device are monitored. A second data file is extracted based on the monitoring of the network communications of the particular computing device. At least a first set of features of the second data file is extracted. A match to the first set of features of the second data file is determined based at least on the first set of features of the first data file, the determination of the particular non-match, and the determination of the particular match. The method further includes one or more of alerting regarding, reporting, disabling, blocking, or deleting the second data file via the particular computing device based on the determination of the match to the first set of features of the second data file.

Yet another method of updating and applying a ruleset used for determining and mitigating malware threats is provided in which network communications of one or more computing devices are monitored. A first data file is extracted based on the monitoring of the network communications of the one or more computing devices. At least a first set of features of the first data file and a second set of features of the first data file are extracted. A first rule is applied to the first set of features of the first data file to determine a non-match by the first rule to the first set of features of the first data file. A second rule is applied to the second set of features of the first data file to determine a match by the second rule to the second set of features of the first data file. A third rule is generated based at least on the first set of features of the first data file, the determination of the non-match by the first rule to the first set of features of the first data file, and the determination of the match by the second rule to the second set of features of the first data file. The third rule and the first rule are merged to create a merged rule. Network communications of a particular computing device are monitored. A second data file is extracted based on the monitoring of the network communications of the particular computing device. At least a first set of features of the second data file is extracted. The merged rule is applied to the first set of features of the second data file to determine a match by the merged rule to the first set of features of the second data file. The method 1000 further includes one or more of disabling, blocking, or deleting the second data file via the particular computing device based on the determination of the match by the merged rule to the first set of features of the second data file.

A non-transitory computer readable storage medium is provided having computer-executable instructions that when executed cause one or more processors to perform operations for updating and applying a ruleset used for determining and mitigating malware threats. The operations enable that network communications of one or more computing devices are monitored. The operations further enable that a first data file is extracted based on the monitoring of the network communications of the one or more computing devices. At least a first set of features of the first data file and a second set of features of the first data file are extracted. A first rule is applied to the first set of features of the first data file to determine a non-match by the first rule to the first set of features of the first data file. A second rule is applied to the second set of features of the first data file to determine a match by the second rule to the second set of features of the first data file. A third rule is generated based at least on the first set of features of the first data file, the determination of the non-match by the first rule to the first set of features of the first data file, and the determination of the match by the second rule to the second set of features of the first data file. Network communications of a particular computing device are monitored. A second data file is extracted based on the monitoring of the network communications of the particular computing device. At least a first set of features of the second data file are extracted. The third rule is applied to the first set of features of the second data file to determine a match by the third rule to the first set of features of the second data file. The second data file is one or more of disabled, blocked, or deleted via the particular computing device based on the determination of the match by the third rule to the first set of features of the second data file.

A network-enabled threat mitigation system is provided including a first computing system and a second computing system. The first computing system is configured for monitoring network communications of one or more computing devices, for extracting a first data file based on the monitoring of the network communications of the one or more computing devices, and for extracting at least a first set of features of the first data file and a second set of features of the first data file. The first computing system is also configured for applying a first rule to the first set of features of the first data file to determine a non-match by the first rule to the first set of features of the first data file, and for applying a second rule to the second set of features of the first data file to determine a match by the second rule to the second set of features of the first data file. The first computing system is further configured for generating a third rule based at least on the first set of features of the first data file, the determination of the non-match by the first rule to the first set of features of the first data file, and the determination of the match by the second rule to the second set of features of the first data file, and for transmitting the third rule. The second computing system is configured for receiving the third rule from the first computing system, for monitoring network communications of the second computing system, and for extracting a second data file based on the monitoring of the network communications of the second computing system. The second computing system is further configured for extracting at least a first set of features of the second data file, for applying the third rule to the first set of features of the second data file to determine a match by the third rule to the first set of features of the second data file, and for one or more of disabling, blocking, or deleting the second data file based on the determination of the match by the third rule to the first set of features of the second data file.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 9:
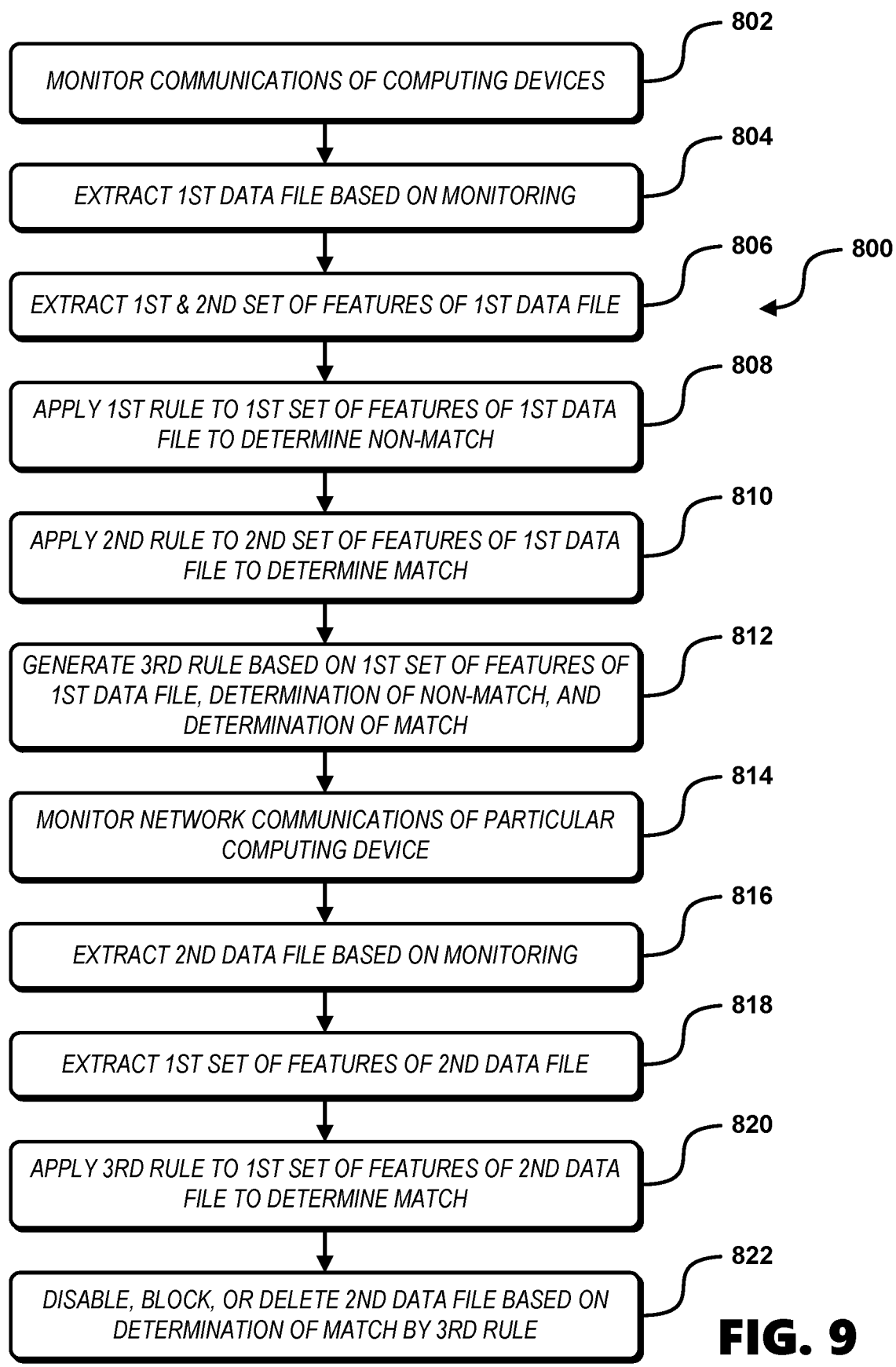
Figure 10:
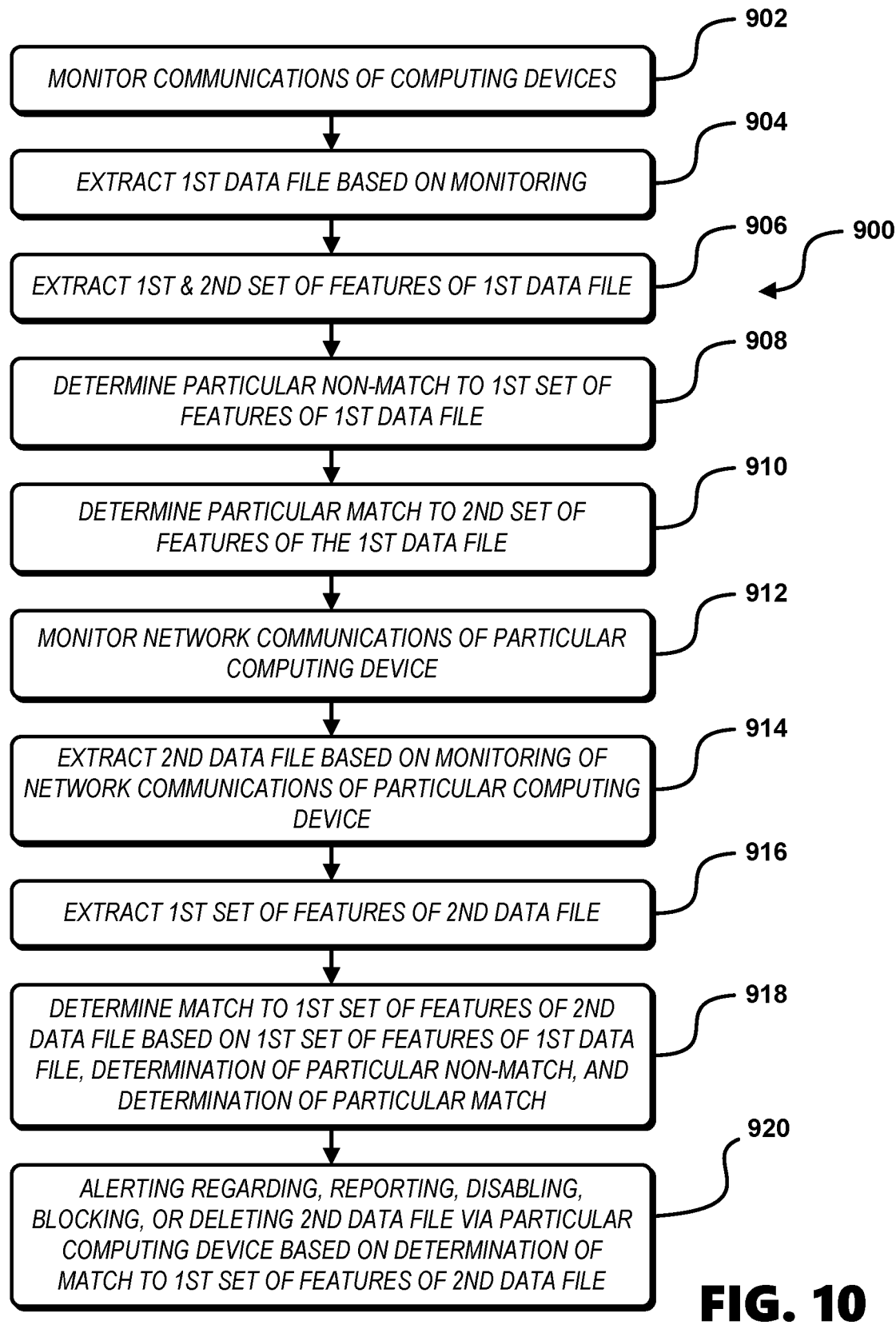
Figure 11:
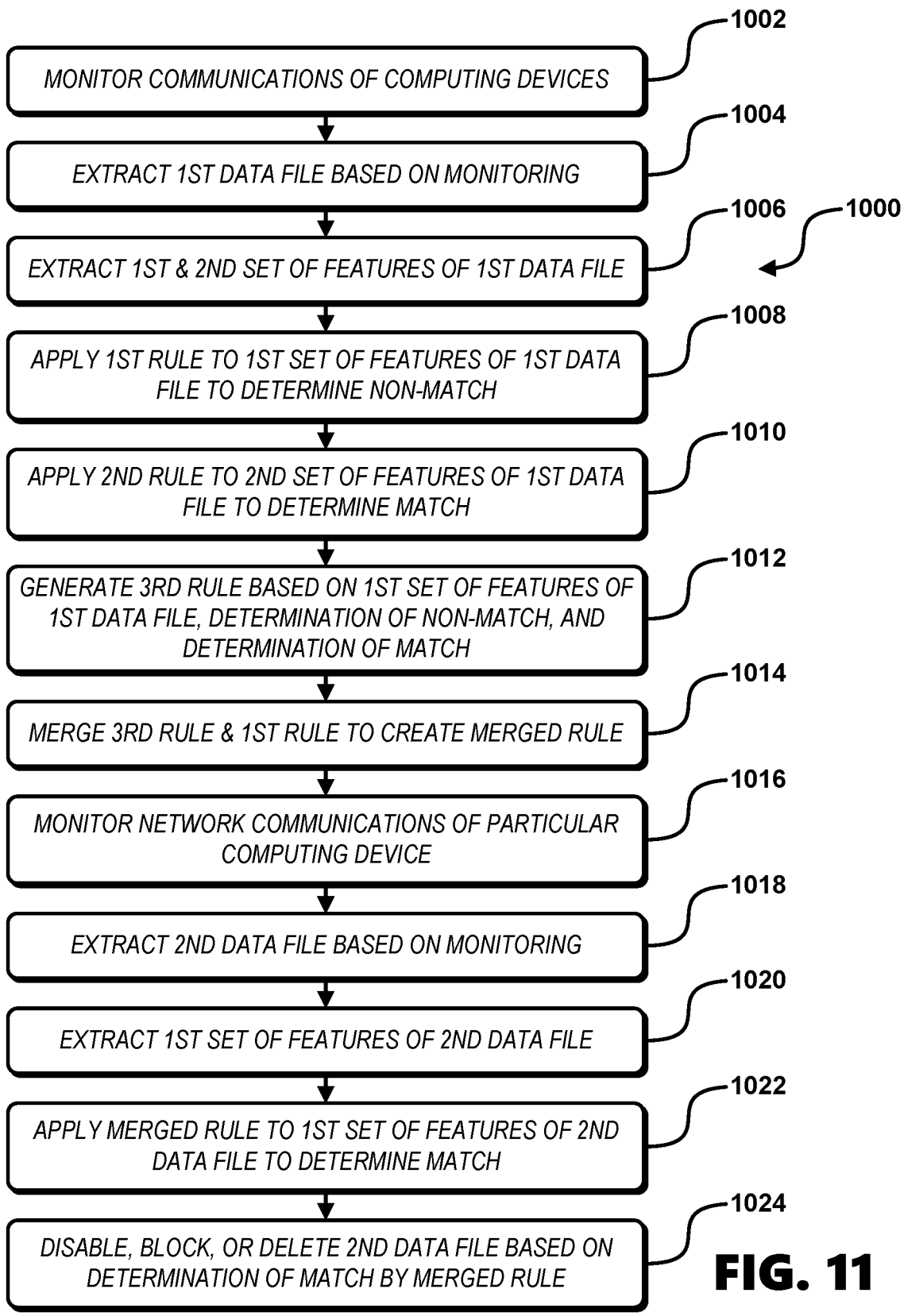

FIGS. 9, 10, and 11 are diagrams showing methods of generating and applying rules to extracted data files.

Figure 12:
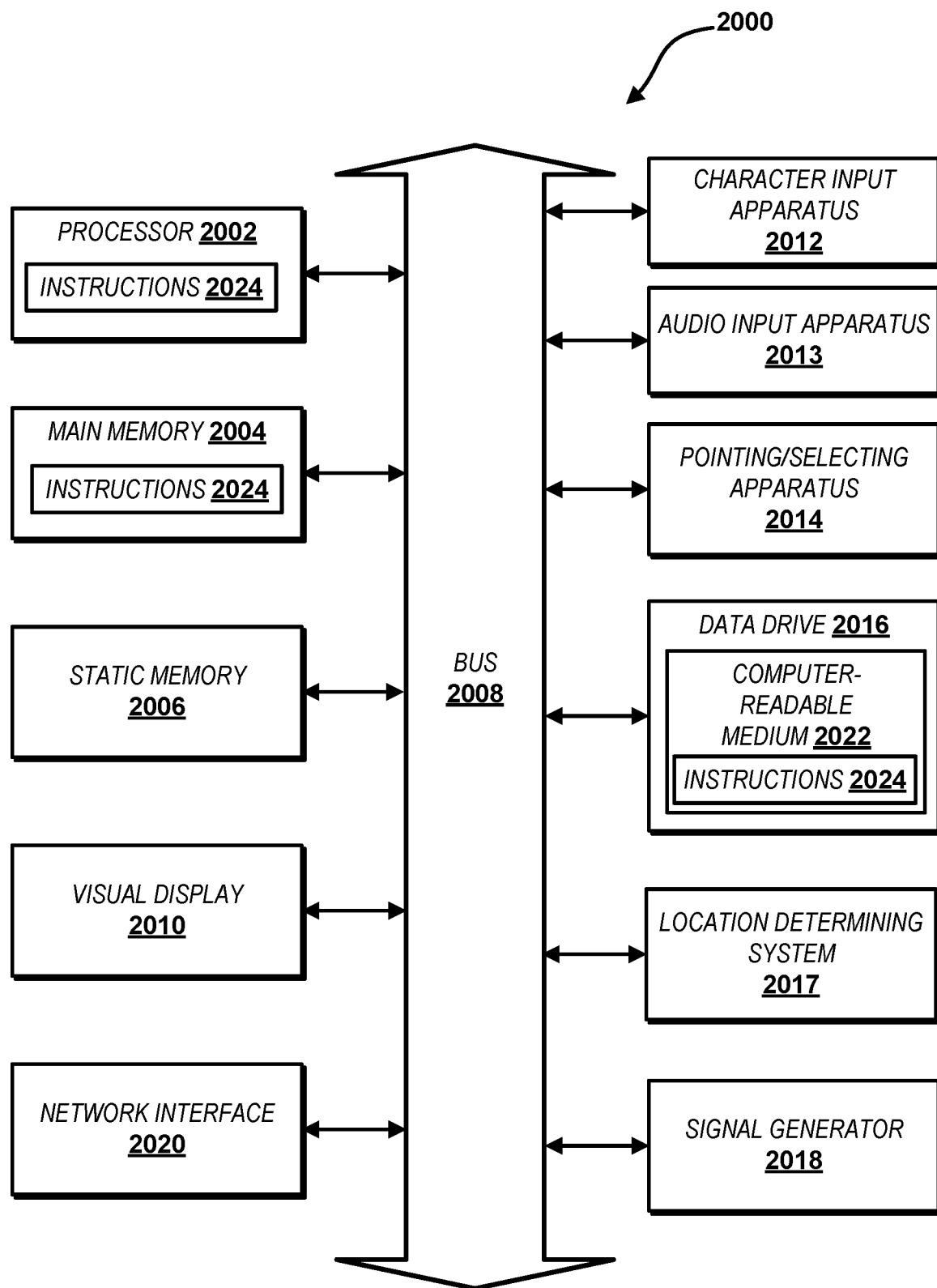

FIG. 12 shows a computer system for performing described methods according to illustrative embodiments.

DETAILED DESCRIPTION OF ILLUSTRATIVE EMBODIMENT(S)

Herein described are systems and methods directed at solving the problem of keeping a ruleset for detecting malware threats fit by systematically discovering obsolete rules in strain-specific ensembles of rules and generating appropriate updates for the obsolete rules.

Figure 1:
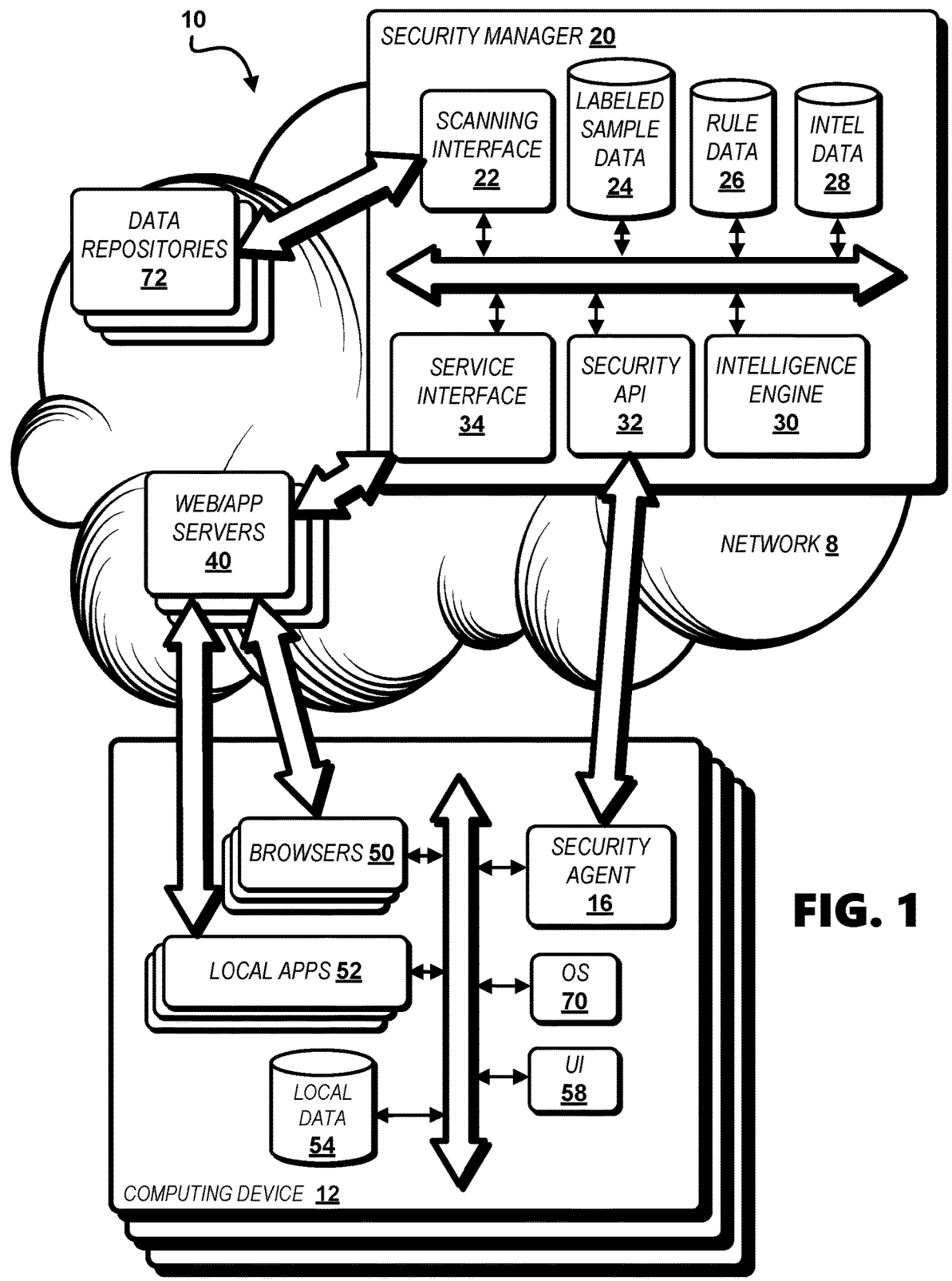
FIG. 1 shows an environment in which data files are aggregated and evaluated for updating rulesets for detecting malware and in which updated rulesets are applied to malware threats encountered by computing devices.

Referring to FIG. 1, an environment 10 enabled by a computer network 8 is illustrated in which a network-connectable processor-enabled security manager 20 generates and updates rules used for detecting threats to computing devices. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A security agent 16 enables monitoring of use of a computing device 12, including messages, message attachments, and downloads to the computing device 12 as well as the browsing history and clickstream of a user on a computing device 12. The monitoring by the security agent 16 provides the security manager 20 with intelligence data including data files and ordered sequences of hyperlinks followed by a user at one or more websites or other network destinations, which data is beneficially stored in de-identified form in an intelligence database 28.

Web or application ("web/app") servers 40 can function to enable local applications 52 or components of local applications 52. The web/app servers 40 can further enable online services including network-based applications, webpages, or other online services accessible via a browser application ("browser") 50. A user is enabled to engage an online service enabled by a web/app server 40 for example by registering a user account for which account credentials (e.g., username, password) are created by the user or an administrator of the service. The security manager 20 can gather intelligence data in the form of data files and content from web/app servers 40 via a service interface 34 which data is stored in the intelligence database 28. The security manager 20 can further gather intelligence data in the form of data files and content from network-accessible third-party data repositories 72 via a scanning interface 22 which data is also stored in the intelligence database 28.

The security manager 20 coupled to a computing device 12 enables threat detection and mitigation to be provided to the computing device 12 via a security agent 16. The security agent 16 monitors user activity on the computing device 12 including messaging (e.g., email and text messaging), use of local and network-based applications and access of websites and of particular content on local and network-based applications and websites, which data is fed to the security manager 20 via a security application program interface ("API") 32 and stored in the intelligence database 28, and which data is used in threat detection and mitigation.

The security agent 16 can be provided integral with or as an extension or plugin to one or more browser applications 50 ("browsers") and provides notices to a user via a user interface 58. The security agent 16 gathers user actions including logins, browsing history, and clickstreams from a browser 50 with which it is integrated or in communication with, which data is transmitted to the security manager 20 via the security API 32 and stored in the intelligence database 28. The security manager 20 provides threat information to the security agent 16 via the security API 32 for enabling the security agent 16 to provide notifications to a user and to filter and block network-based threats confronted by a browser 50, which threat information can be stored in a local database 54.

The security agent 16 further can engage with local applications 52, for example standalone applications, plugins, add-ons, or extensions to existing applications, to manage threats confronted by the local applications 52. The local applications 52 can include for example email or messaging clients, and threats can include malicious emails including malicious attachments or links to malicious data on a network. Further, the security agent 16 can monitor actions performed via the local applications 52 including logins to online services enabled by the local applications 52, which data is transmitted to the security manager 20 via the security API 32 and stored in the intelligence database 28. An operating system 70 (hereinafter "OS 70") is executed on the computing device 12 which enables integration of the security agent 16 and the browsers 50 and local applications 52.

Data collected via monitoring by the security agent 16 is used by the security manager 20 to generate and update rules (e.g., YARA rules) for identifying malicious data files. Rules can be grouped and applied in ensembles specific to a particular strain of malware ("malware strain-specific" ensembles). In a particular embodiment, a herein described system systematically discovers obsolete rules (e.g., YARA rules) in malware strain-specific ensembles of rules, and the system updates the obsolete rules via the intelligence engine 30. The update process includes discovering an obsolete rule within a particular malware strain-specific rule ensemble, filtering sample data files ("samples") representing a new variant of the malware strain (unmatched by a particular rule in the ensemble) from a repository of samples, and analyzing filtered samples for an appropriate update. Further, the update of a rule can be automatically merged with the original rule if the quality of the update meets certain criteria.

The obsolete nature of a particular rule in an ensemble is recognized when a particular sample is discovered which the particular rule does not match, but other rules of the ensemble do match it. The particular sample can be deemed "suspicious" as it is likely to represent a new variant of a particular malware strain. Rules are beneficially constructed to have zero false positives such that a sample matched by any of the rules in an ensemble is likely to be malicious. After filtering suspicious samples, features of the suspicious samples are analyzed, and an appropriate rule update is constructed.

Rules can be classed as behavioral rules directed to behaviors of an executed application. Rules can alternatively be classed as static rules directed to data available from unexecuted applications, data available as payloads of executed applications, and other static data forms. Static rules and behavioral rules can be updated. Beneficially, behavioral rules are updated by discovering unknown named object names. Beneficially, behavioral rules are updated by discovering new descriptive features. The quality of a rule update is beneficially evaluated by a classifier. If the quality of the rule update is convincing based on the classifier output, the update is automatically merged with the original rule and the merged rule is submitted to a rule database 26.

Figure 2:
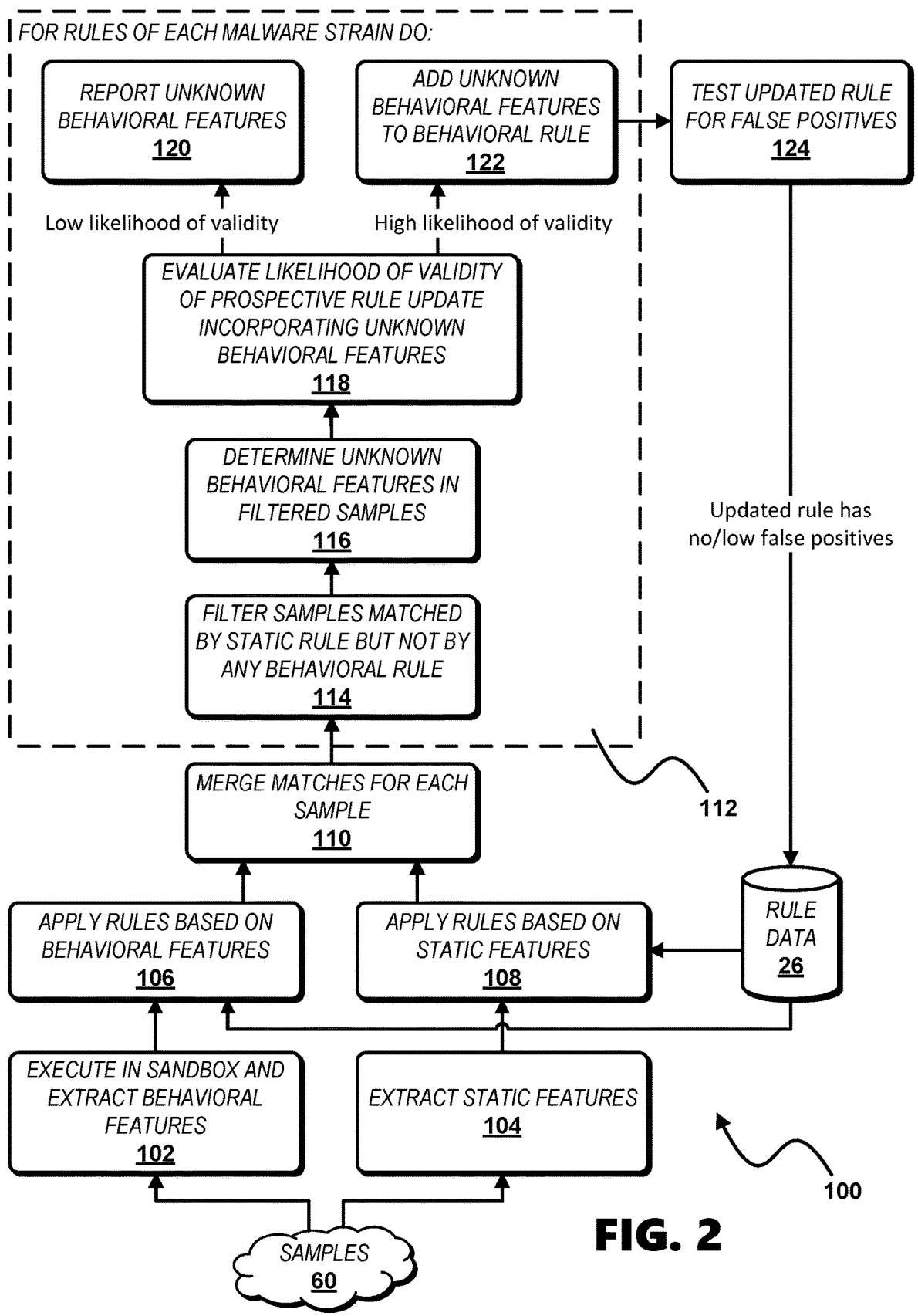
FIG. 2 is a diagram showing a method of updating behavior rules of a ruleset used for determining malware threats.

Referring to FIG. 2, a method 100 of updating a ruleset including one or more ensembles of rules used for determining malware threats is disclosed. The method 100 is described with reference to the components in the environment 10, and steps of the method 100 can be performed by the security manager 20 via the intelligence engine 30, by the security agent 16 via the computing device 12, or by a combination thereof. Alternatively, the method 100 can be performed via other components in other environments and is not restricted to being implemented by the so described components. Sample data files ("samples") 60, for example sample executable files aggregated and stored in the intelligence database 28, are analyzed for example by the intelligence engine 30 to generate updates to sets of rules ("ensembles"), which updated ensembles are stored in the rule database 26. Samples 60 can be aggregated by the security agent 16 via monitoring processes on a computing device 12. Samples 60 can further be gathered from the third-party data repositories 72 providing security data and web/app servers 40.

In a step 102, each sample data file ("sample") is executed in a sandbox environment and behavioral features are extracted. Behavioral features include actions performed by execution of the sample. Static features are also extracted from the data file (step 104). Static features include data and content which may be accessible without execution of the sample or rendered accessible by the sample by execution of the sample (e.g., a payload of the executed sample). In a step 106, rules based on the extracted behavioral features ("behavior rules") are applied and matched (i.e., satisfied). In a step 108, rules based on the extracted static features ("static rules") are applied and matched (i.e., satisfied). A rule can be satisfied for example when the respective values of one or more features of a sample are equal to respective particular values, or alternatively when the respective values of one or more features are within respective ranges. When applied to a sample, a rule is either "matched" (i.e., the classification is positive) or not (i.e., the classification is negative). In a step 110, for each sample, results of matching of applied rules are grouped together to merge the matches of the rules.

A process grouping 112 provides steps performed for the sets of rules ("ensembles") of each of a plurality of identified malware strains. In a step 114, samples which are matched by one or more static rules including one or more static features, but not matched by any behavior rule including one or more behavioral feature, are filtered. In a step 116, unknown behavioral features (e.g., new named objects) of the filtered samples, including behavioral features not identified as triggering a match in any existing behavioral rule, are determined and used to generate a prospective behavioral rule update.

In a step 118, a generated behavioral rule update is applied to particular files for the purpose of validation. The behavioral rule update can be applied to the samples 60 or a portion of the samples 60 matched in steps 106 and 108. Validation in step 118 produces data including statistics describing the fitness of the behavioral rule update including one or more of a false positive rate ("FPR"), a true positive rate ("TPR"), or a number of malware strains matched by the behavioral rule update. The data produced are determined based on application of the behavioral rule update to particular files whose security status is known (e.g., malicious files, non-malicious files), wherein the security statuses of the particular files are known based on application of one or more other previously validated rules. It is beneficial to confirm in the step 118 that the behavioral rule update matches one or more of the files for which no existing behavioral rule was matched and for which one or more existing static rules did match. This provides confirmation that the behavioral rule update has a non-zero TPR. It is also beneficial to confirm in the step 118 that the behavioral rule update has no matches on files known to be benign (i.e., a zero FPR) or alternatively a relatively small amount of matches on files known to be benign (i.e., a low false positive rate).

In the step 118, a classifier is applied to the determined data that describes the fitness of the behavioral rule update (e.g., false positive rate ("FPR"), true positive rate ("TPR"), number of matched malware strains) to determine a likelihood of validity of the behavioral rule update. An output of the classifier that reflects a low likelihood of validity results in generation of a report. The report beneficially includes a description of the behavioral rule update and its associated features (i.e., previously unknown behavioral features) and corresponding values as well as data describing fitness of the behavioral rule update (e.g., TPR, FPR) and the classifier output indicating a low likelihood of validity (step 120). Output of the classifier reflecting a high likelihood of validity for the behavioral rule update results in step 122 in which the behavioral rule update including the previously unknown behavioral features is merged with the behavioral rule to create an updated rule (i.e., a merged rule).

The updated rule is tested on a plurality of sample data files for false positives (step 124) which testing can be used in the training of the classifier applied in step 118. Beneficially, the updated rule is tested on live files (different from the samples 60) recently received via the security agent 16 or other source providing real-time, near real-time, or otherwise fresh sample data. If the updated rule is determined to have no false positives, or a low rate of false positives, the updated rule is retained in the rule database 26 for further application in the method 100. It is beneficial to confirm in the step 124 that the updated rule matches one or more of the files for which no existing behavioral rule was matched and for which one or more existing static rules did match. This provides confirmation that the updated rule has a non-zero TPR. It is also beneficial to confirm in the step 124 that the updated rule has no matches on files known to be benign (i.e., a zero FPR) or alternatively a relatively small amount of matches on files known to be benign (i.e., a low FPR). Referring to FIG. 1, updated rules are distributed to computing devices 12 via the security API 32 for use by the security agent 16 in detecting and mitigating malware threats on the computing devices 12.

Figure 3:
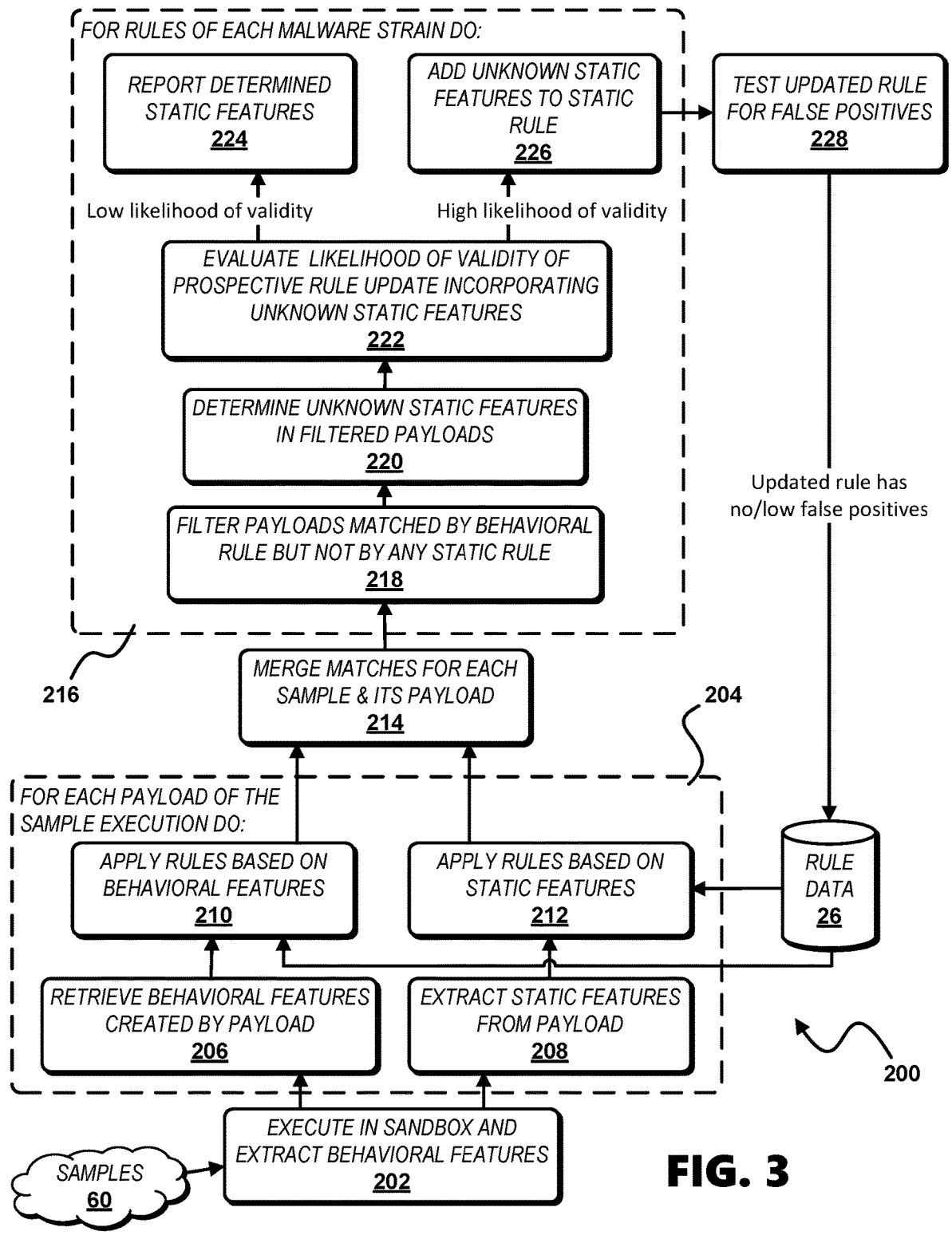
FIG. 3 is a diagram showing a method of updating static rules of a ruleset used for determining malware threats.

Referring to FIG. 3, a further method 200 of updating a ruleset including one or more ensembles of rules used for determining malware threats is disclosed. The method 200 enables an automated workflow to produce rule updates for static rules including rules based on static features. The method 200 solves the problem of invalidity of static features for a packed sample by focusing on analysis of particular payloads released in a sandbox execution of a packed sample. The method 200 operates based on an assumption that if a payload matches a behavioral rule, the payload is most probably unpacked and thus its static features may be relevant with respect to a static rule.

The method 200 is described with reference to the components in the environment 10 and steps of which can be performed by the security manager 20 via the intelligence engine 30, by the security agent 16 via the computing device 12, or by a combination thereof. Alternatively, the method 200 can be performed via other components in other environments and is not restricted to being implemented by the so described components. Samples 60, for example sample executable files stored in the intelligence database 28, are analyzed for example by the intelligence engine 30 to generate updates to rulesets, which updated rulesets are stored in the rule database 26.

In a step 202, each sample 60 is executed in a sandbox environment, payloads are released, and behavioral features created by the payloads are extracted. Static features are also extracted from the sample 60. A process grouping 204 describes steps performed for each payload released by the execution of each sample. Behavioral features created by the payload are retrieved (step 206). Static features are extracted from the payload (step 208). In a step 210, rules based on the extracted behavioral features ("behavior rules") are applied and matched. In a step 212, rules based on the extracted static features ("static rules") are applied and matched. A rule can be satisfied for example when the respective values of one or more features of a sample are equal to respective particular values, or alternatively when the respective values of one or more features are within respective ranges. When applied to a sample, a rule is either "matched" (i.e., the classification is positive) or not (i.e., the classification is negative). In a step 214, results of matching of applied rules are grouped together to merge the matches of the rules for each sample data file and its payload.

A process grouping 216 provides steps performed for the sets of rules ("ensembles") of each of a plurality of identified malware strains. In a step 218, payloads which are matched by one or more behavioral rules, including one or more behavioral features, but not matched by any static rule, including one or more static features are filtered. In a step 220, unknown static features (e.g., sequences of the binary code) of the filtered payloads, including static features not identified as triggering a match in any existing static rule, are determined and used to generate a prospective static rule update.

In a step 222, a generated static rule update is applied to particular files for the purpose of validation. The static rule update can be applied to the samples 60 or a portion of the samples 60 matched in steps 210 and 212. Validation in step 222 produces data including statistics describing the fitness of the static rule update including one or more of a false positive rate ("FPR"), a true positive rate ("TPR"), or a number of malware strains matched by the static rule update. The data produced are determined based on application of the static rule update to particular files whose security status is known (e.g., malicious files, non-malicious files), wherein the security statuses of the particular files are known based on application of one or more other previously validated rules. It is beneficial to confirm in the step 222 that the static rule update matches one or more of the files for which no existing static rule was matched and for which one or more existing behavioral rules did match. This provides confirmation that the static rule update has a non-zero TPR. It is also beneficial to confirm in the step 222 that the static rule update has no matches on files known to be benign (i.e., a zero FPR) or alternatively a relatively small amount of matches on files known to be benign (i.e., a low FPR).

In the step 222, a classifier is applied to the determined data that describes fitness for the static rule update (e.g., false positive rate ("FPR"), true positive rate ("TPR"), number of matched malware strains) to determine a likelihood of validity of the static rule update. An output of the classifier that reflects a low likelihood of validity results in generation of a report. The report beneficially includes a description of the static rule update and its associated features (i.e., previously unknown static features) and corresponding values as well as data describing fitness of the static rule update (e.g., TPR, FPR) and the classifier output indicating a low likelihood of validity (step 224). Output of the classifier reflecting a high likelihood of validity for the static rule update results in step 226 in which the static rule update including the previously unknown static features is merged with the static rule to create an updated rule.

The updated rule is tested on a plurality of sample data files for false positives (step 228) which testing can be used in the training of the classifier applied in step 222. Beneficially, the updated rule is tested on live files (different from the samples 60) recently received via the security agent 16 or other source providing real-time, near real-time, or otherwise fresh sample data. If the updated rule is determined to have no false positives, or a low rate of false positives, the updated rule is retained in the rule database 26 for further application in the method 200. It is beneficial to confirm in the step 228 that the updated rule matches one or more of the files for which no existing static rule was matched and for which one or more existing behavioral rules did match. This provides confirmation that the updated rule has a non-zero TPR. It is also beneficial to confirm in the step 228 that the updated rule has no matches on files known to be benign (i.e., a zero FPR) or alternatively a relatively small amount of matches on files known to be benign (i.e., a low FPR). Referring to FIG. 1, updated rules are distributed to computing devices 12 via the security API 32 for use by the security agent 16 in detecting and mitigating malware threats on the computing devices 12.

In an illustrative embodiment, rules described herein can include conditions where Boolean features are utilized. For example a rule can be satisfied when a first feature is present (or alternatively, missing) and/or a second feature is present (or alternatively, missing). Features of other data types can be utilized as well. String features can be utilized in the conditions of the rules. For example, the existence of an object "mutex" with exact value "MutexName" can be checked for, and the corresponding rule is satisfied if a file contains an object of type "mutex" with value "Mutex-Name". The value of a feature need not be exact and can be within a range to satisfy a rule. For example, a feature such as debugSize may satisfy a rule when its value, the size of a debug directory table, is within a particular range.

In an illustrative embodiment, rules described herein can be provided as YARA rules. A YARA rule can be perceived as a rule-based classifier that describes a particular malware strain using specific static features, dynamic features (e.g., behavioral features), or other feature type. When applied to a sample data file ("sample"), a YARA rule is either "matched" (i.e., satisfied) when the classification is positive or "not matched" (i.e., not satisfied) when the classification is negative. False positives of the classification are beneficially not tolerated. YARA rules can be used for example to allow for extraction of only certain types of features. A particular malware strain can be covered with an ensemble of multiple YARA rules where each of the YARA rules utilizes different types of features. As new variants of known malware strains appear, it is of crucial importance to keep each ensemble of strain-specific rules up to date. Described herein with reference to FIGS. 4, 5A, 5B, 6, and 7 are rule updating procedures which are applicable for example as YARA rule updating procedures which solve the problem of updating a rule that is part of an ensemble in the context of a very low tolerance towards false positives. Alternatively, the described rule updating procedures can be used with other rule types.

In an example implementation of herein described methods, a dataset $\Omega$ of executable files ("samples" S), for example Windows Portable Executable ("PE") files, with number N>0 samples is provided in Equation 1.

$$\Omega = \{S_i, 0 < i \leq N\} \qquad \text{Eq. 1}$$

For a proper subset of samples $\Omega_C \subset \Omega$ a trusted label exists regarding their clean (i.e., benign, not malware-infected) nature.

$$\Omega_C = \{S_i \in \Omega : S_i \text{ is a trusted clean sample}\} \qquad \text{Eq. 2}$$

For each sample $S_i$ two types of features can be extracted, depicted herein by A and B. Alternatively, more or less types of features can be extracted, but beneficially at least one type of feature is extracted, that is where M represents the number of types of features extracted, M>0. Features of type A are represented by Arabic numerals, and features of type B are represented by Roman numerals. For simplicity of explanation, features are described herein as having one of two values: present or missing. Alternatively, features can have other values. Rules, depicted by R, are Boolean expression classifiers built upon the features. It is indicated herein that "R matches $S_i$" if the respective Boolean expression returns True (i.e., $R(S_i)$=True) when evaluated on the features of $S_i$. A set of rules can form an ensemble E. In a typical implementation, every rule of the ensemble E can operate on a different feature, but all the rules in an ensemble E apply to the same target strain of malware. In the herein described use case, all rules within E are very reliable, i.e., have a zero false positive rate ("FPR") on $\Omega_C$ (dataset of clean samples) as set forth in Equation 3.

$$FPR_{\Omega_C}(R) = 0, \forall R \in E \qquad \text{Eq. 3}$$

It is assumed that the rules generalize well from $\Omega_C$ (dataset of clean samples) to $\Omega$ (complete dataset of samples), which implies the following set forth in Equation 4.

$$FPR_{\Omega}(R) \approx 0, \forall R \in E \qquad \text{Eq. 4}$$

Equivalently, it is assumed that samples which were matched by rules from $E \backslash R_A$ have a reliable malicious label from the perspective of the rule $R_A$ for features of type A. A set of malicious samples is defined with respect to $E \backslash R_A$ as set forth in Equation 5.

$$\Omega_{E \backslash R_A} = \{S \in \Omega : \exists R \in E \backslash R_A : R(S) = \text{True}\} \qquad \text{Eq. 5}$$

Figure 4:
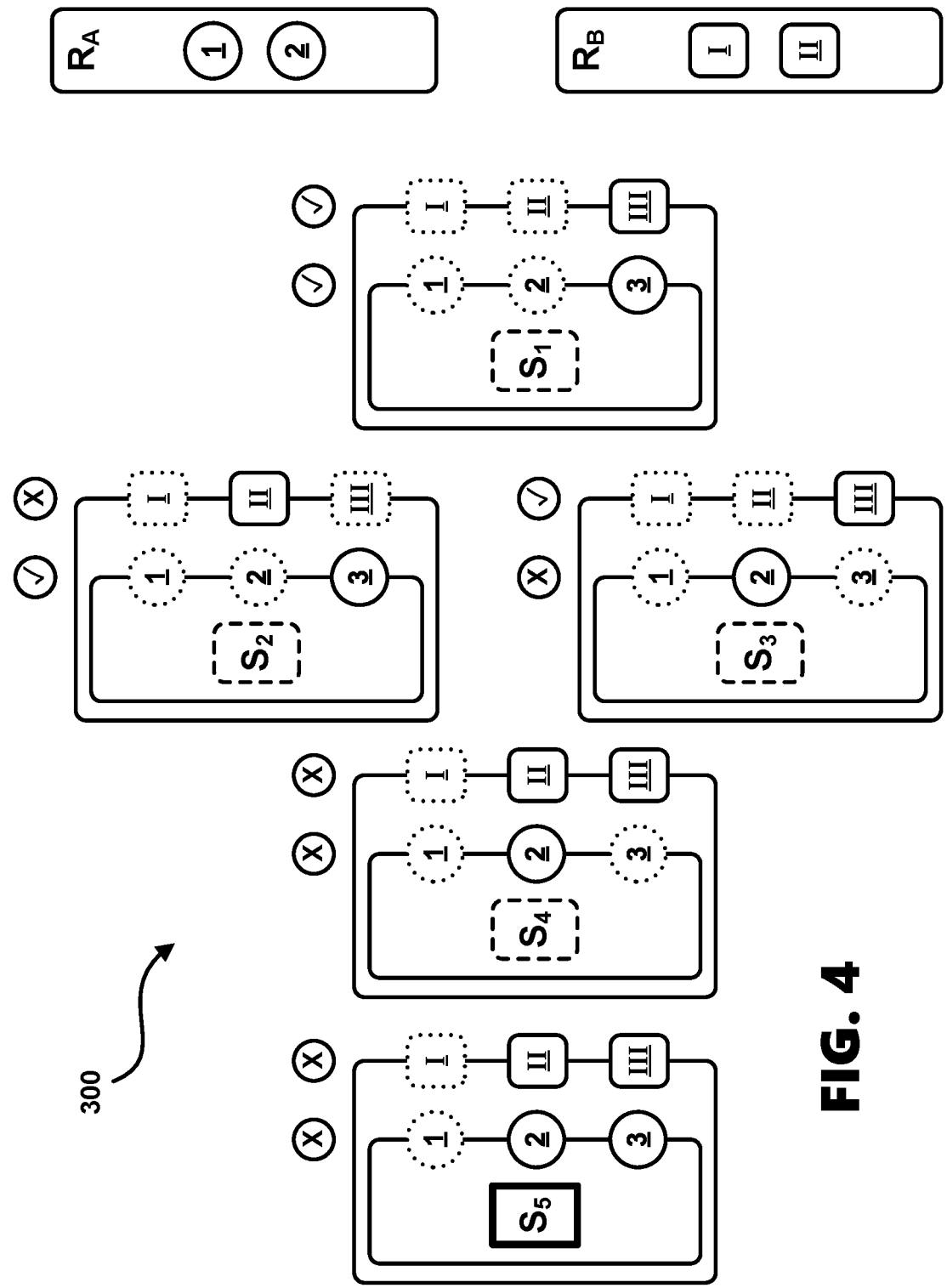
FIG. 4 is a diagrammatic representation of an application of rules for determining malware threats.

Referring to FIG. 4, a diagrammatic representation 300 is shown of an application of rules $R_A$ (for features of type A) and $R_B$ (for features of type B) forming an ensemble E={$R_A$, $R_B$} to five typical samples, in which $R_A = 1 \wedge 2$ and $R_B = I \wedge II$. The features of type A are represented by circle-shaped symbols with Arabic numerals 1, 2, and 3. The features of type B are represented by square-shaped symbols with Roman numerals I, II, and III. Dotted-lined symbols depict a present feature. Solid-lined symbols depict a missing feature. The dashed-lined inner squares represent true malicious labels of the sample data files $S_1$, $S_2$, $S_3$, and $S_4$. The solid-lined inner square represents a true benign (i.e., clean, non-malicious) label of the sample $S_5$.

The sample $S_1$ is matched by both rules $R_A$ and $R_B$ as depicted by check icons respectively positioned above the symbols for features of type A and the features of type B, which situation represents an ideal case where both rules $R_A$ and $R_B$ reach the same result. The samples $S_2$ and $S_3$ represent cases in which one of the rules $R_A$ and $R_B$ do not match, which situations are a primary focus herein wherein methodologies are provided for updating the rules $R_A$ and $R_B$ so that samples such as $S_2$ and $S_3$ are matched by both rules $R_A$ and $R_B$. Updating is facilitated in the context of rules with extremely low false positive rates ("FPRs"). For example, a new or updated rule identifying a particular sample as malicious can be created with confidence based on the knowledge that an identification of the particular sample as malicious based on an existing rule is valid. Samples $S_4$ and $S_5$ represent situations that are matched by neither $R_A$ nor $R_B$.

Figure 5:
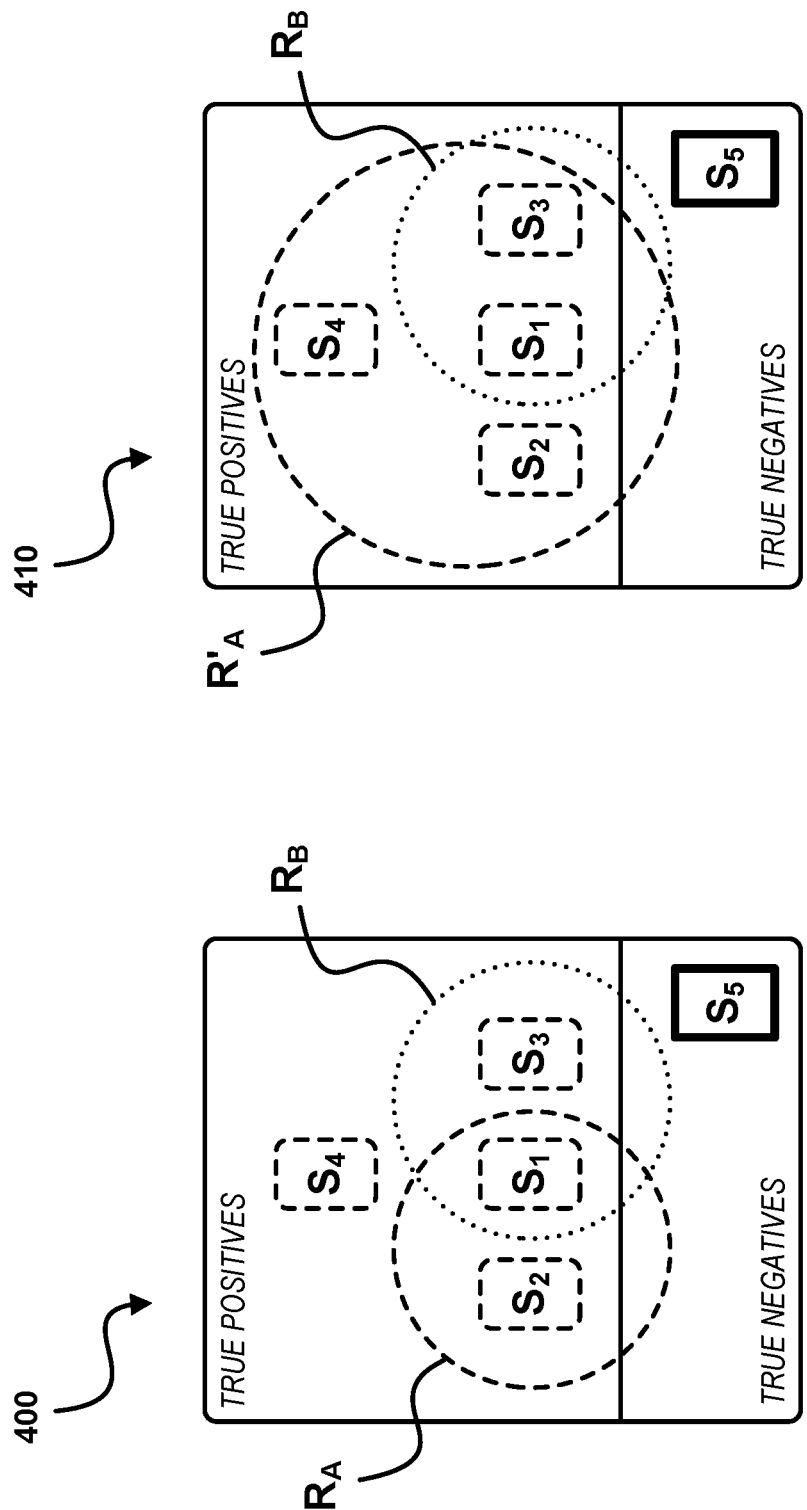
FIGS. 5A and 5B are Venn diagrams depicting the application of rules represented in FIG. 4.

Referring to FIGS. 5A and 5B, Venn diagrams 400, 410 depict the rules $R_A$ and $R_B$ together with samples $S_1$, $S_2$, $S_3$, $S_4$, and $S_5$. A first Venn diagram 400 is provided depicting the rules $R_A$ and $R_B$ as described in FIG. 4 as respective dashed and dotted circles and depicting the samples to which each rule is matched within the respective circles represented by the rules $R_A$ and $R_B$. The first Venn diagram 400 shows that the sample $S_3$ creates an opportunity to update the rule $R_A$. A second Venn diagram 410 shows a situation after the update of the rule $R_A$. In order to cover the sample $S_3$, the rule $R_A$ is updated to $R'_A$, and as a result the sample $S_4$, which was previously unmatched by any rule, is also covered. The rule $R_A$ is replaced by the stronger rule $R'_A$ which has a superior true positive rate ("TPR") compared to the rule $R_A$, i.e., matches the sample $S_3$ previously covered only by rule $R_B$ with the benefit of matching the previously un-covered sample $S_4$ while keeping the FPR on the dataset of clean samples $\Omega_C$ zero.

Without loss of generality, the rule $R_A$ is updated with respect to the rest of the rules (e.g., rule $R_B$) in the ensemble E. First, as set forth in Equation 6, samples are selected which do not match the rule $R_A$ but do match one or more of the other rules in $E \backslash R_A$:

$$\Omega_{Y(E,R_A)} = \{S \in \Omega_{E \backslash R_A} : R_A(S) = \text{False}\} \quad \text{Eq. 6}$$

The population $\Omega_{Y(E,R_A)}$ is designated as suspicious samples because the population $\Omega_{Y(E,R_A)}$ suggests that the performance of the rule $R_A$ is not sufficient anymore, and that the malware strain has changed, and the rule $R_A$ needs to be updated. Second, $\Omega_{Y(E,R_A)}$ and $\Omega_C$ as labeled malicious samples and benign samples, respectively, are utilized to create a new rule $\delta R_A$ with a goal to achieve the highest possible TPR on the suspicious samples $\Omega_{Y(E,R_A)}$ while keeping the FPR on the new rule $\delta R_A$ equal to zero (FPR$_{\Omega_C}$ $(\delta R_A)=0$). Third, if a new rule $\delta R_A$ is successfully created, $R_A$ and $\delta R_A$ can be joined using logical OR into a new updated rule $R'_A = R_A \lor \delta R_A$ and its performance can be tested on an independent dataset different from the dataset $\Omega$.

Figure 6:
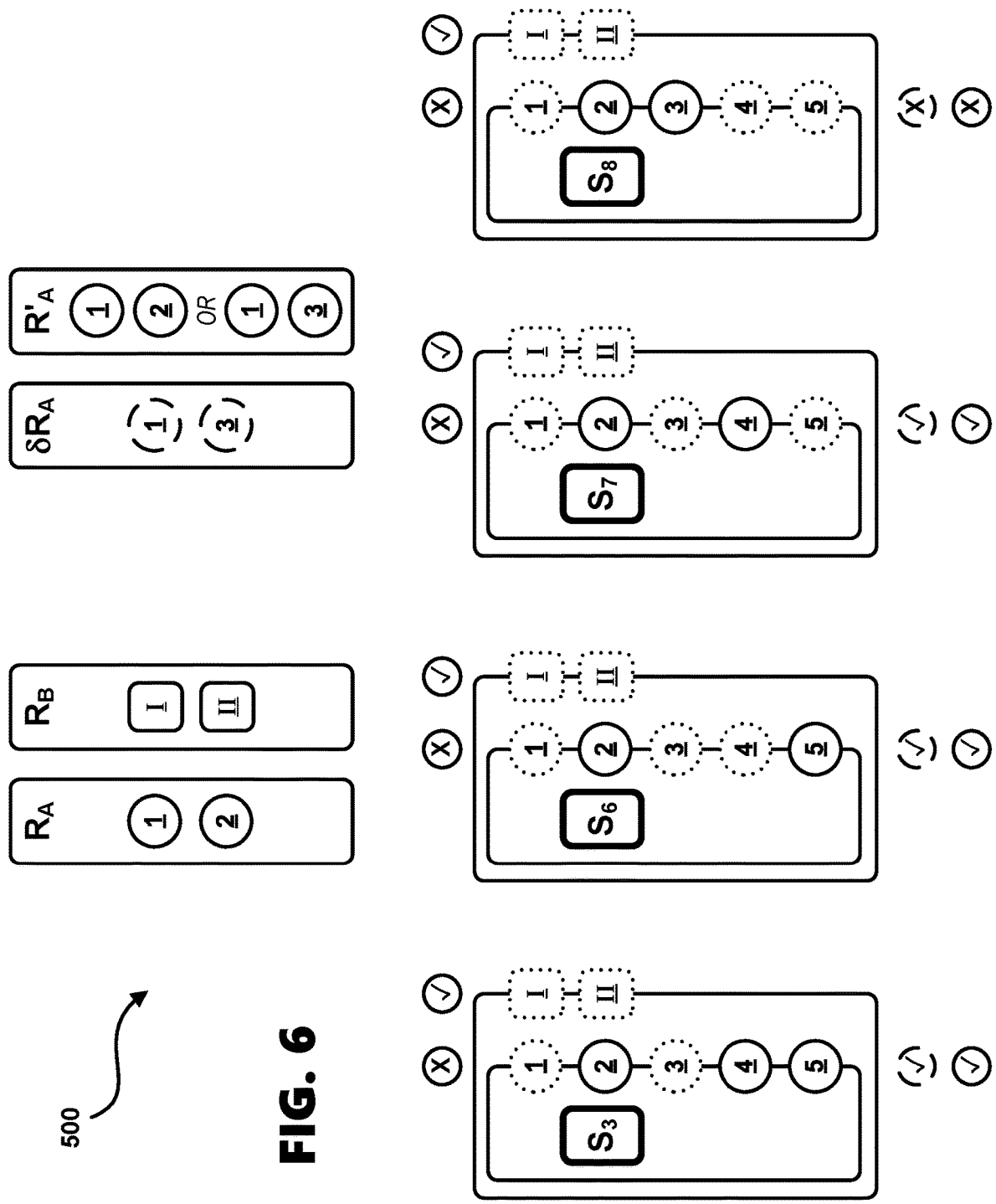
FIG. 6 is a diagrammatic representation of a procedure for updating a rule for determining malware threats.

Referring to FIG. 6, the rule updating procedure 500 of the rule $R_A$ with respect to the rule $R_B$ is depicted. In the example depicted in FIG. 6, the ensemble E consists only of the rules $R_A$ and $R_B$. Hence, the rule $R_A$ is updated with respect to only the rule $R_B$. Alternatively, a greater number of rules can be provided and a particular rule can be updated based on a plurality of other rules. The set of suspicious samples $\Omega_Y$ are samples $S_3$, $S_6$, $S_7$, and $S_8$ which reads $\Omega_{Y(E,R_A)} = \{S_3, S_6, S_7, S_8\}$. The newly created rule $\delta R_A = 1 \land 3$ matches on samples $S_3$, $S_6$, and $S_7$. The resulting updated rule is $R'_A = (1 \land 2) \lor (1 \land 3)$.

In a machine learning implementation, when the rule $\delta R_A$ is created, a new classifier is trained, and suspicious datasets $\Omega_{Y(E,R_A)}$ and clean datasets $\Omega_C$ are used for training the new classifier. Beneficially, the updated rule $R'_A$ is tested on a different dataset to assess its true performance, especially its FPR. The training of $\delta R_A$ relies strongly on the assumption set forth in Equation 4, which implies the inherent assumption that the false positive rate of the updated rule $\delta R_A$ as applied the suspicious data set $\Omega_{Y(E,R_A)}$ is equal to zero, that is that $$FPR_{\Omega_{Y(E,R_A)}}(\delta R_A) = 0.$$

Performance aspects of the rules that are part of the rule-updating procedure are summarized in Table 1. Table 1 shows a comparison of $TPR_{\Omega_{E \backslash R}}$, $TPR_{\Omega_{Y(E,R)}}$, and $FPR_{\Omega_C}$ of rules R, $\delta R$, and $R' = R \lor \delta R$ which are part of the same rule-updating process. It is inherently assumed that $FPR_{\Omega_{Y(E,R)}}(\tilde{R}) = 0$, $\forall \tilde{R} \in \{R, \delta R, R'\}$, $\tilde{R}$ being an iteration index going over all possibilities within the set of R, $\delta R$, R'.

TABLE 1

| Rule | Malicious samples with respect to E\R $\Omega_{E \backslash R}$ (defined in eq. 5) $TPR_{\Omega_{E \backslash R}}$ | Suspicious samples $\Omega_{Y(E, R)}$ (defined in eq. 6) $TPR_{\Omega_{Y(E, R)}}$ | Clean samples $\Omega_C$ (defined in eq. 2) $FPR_{\Omega_C}$ |
|---|---|---|---|
| R | $TPR_{\Omega_{E \backslash R}}(R)$ | 0 | 0 |
| $\delta R$ | $TPR_{\Omega_{E \backslash R}}(\delta R)$ | $TPR_{\Omega_{Y(E, R)}}(\delta R)$ | 0 |
| $R' = R \lor \delta R$ | $TPR_{\Omega_{E \backslash R}}(R') \geq TPR_{\Omega_{E \backslash R}}(R)$ | $TPR_{\Omega_{Y(E, R)}}(\delta R)$ | 0 |

Figure 7:
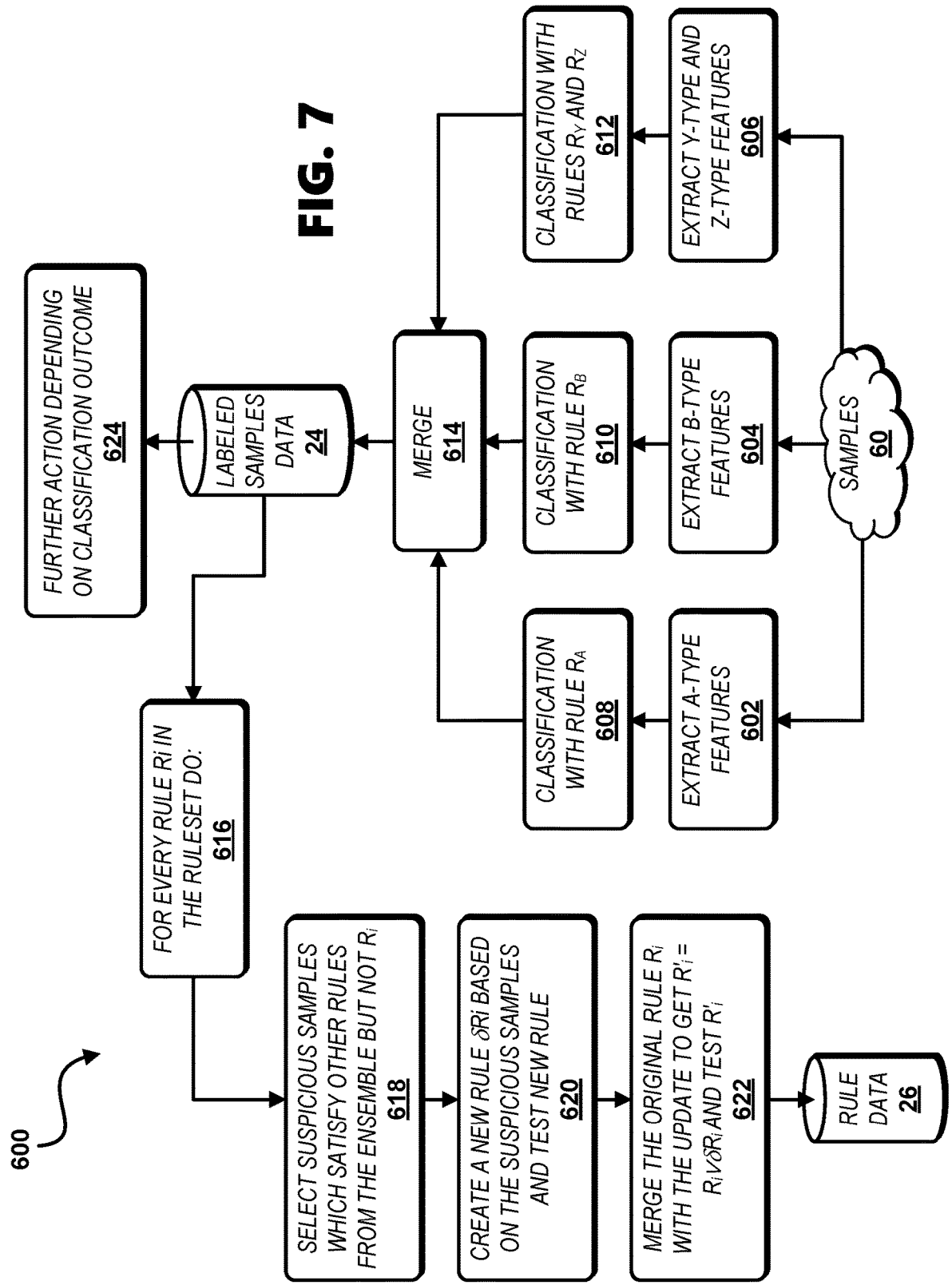
FIGS. 7 and 8 are diagrams showing methods of updating rules of different types for determining malware threats.

Referring to FIG. 7, a further method 600 of updating a ruleset used for determining malware threats is disclosed. The method 600 enables an automated workflow to produce rule updates for static rules, dynamic rules, and other rule types. The method 600 is described with reference to the components in the environment 10, and steps of the method 600 can be performed by the security manager 20 via the intelligence engine 30, by the security agent 16 via the computing device 12, or by a combination thereof. Alternatively, the method 600 can be performed via other components in other environments and is not restricted to being implemented by the so described components. Sample data files ("samples") 60, for example sample executable files stored in the intelligence database 28, are analyzed for example by the intelligence engine 30 to generate updates to rulesets, which updated rulesets are stored in the rule database 26. For performing the method 600, rules $R_A$, $R_B$, $R_Y$ and $R_z$ of a rule ensemble are provided, which rules respectively correspond to A-type features, B-type features, Y-Type features, and Z-type features, and which rules can be stored for example in the rule database 26.

In steps 602, 604, and 606, for each sample 60 A-type features, B-type features, and Y-type and Z-type features are respectively extracted. Samples 60 can be executed in a sandbox environment for example via the intelligence engine 30 to enable release of payloads and extraction of corresponding behavioral features, static features, or other feature types. To extract static features from a particular sample 60 it may or may not be required to execute the particular sample 60. In steps 608, 610, and 612, rules $R_A$, $R_B$, $R_Y$ and $R_z$ are respectively applied to the extracted A-type features, B-type features, and Y-type and Z-type features to perform respective classifications. Results of the classifications are merged in step 614 and resulting samples with features and classification labels are stored in the labeled sample database 24.

A step 616 provides that for every rule $R_i$ (e.g., each of rule $R_A$, $R_B$, $R_Y$ and $R_z$) suspicious samples which satisfy one or more other rules from the ensemble but not $R_i$ are selected (step 618), a new rule $\delta R_i$ is created based on the suspicious samples and tested (step 620), the original rule $R_i$ is merged with the updated rule $\delta R_i$ to get $R'_i$ ($R_i \lor \delta R_i$), and the updated rule $R'_i$ is tested (step 622). In testing the new rule $\delta R_i$ in step 620, one or more of a TPR, an FPR, or a number of malware strains matched by the new rule $\delta R_i$ are determined based on the samples 60 or based on ones of the samples 60 matched in steps 608, 610, and 612, and a classifier ("validity classifier") is applied to the one or more of the TPR, the FPR, or the number of matched malware strains to evaluate a likelihood that the new rule $\delta R_i$ is valid. The new rule $\delta R_i$ beneficially incorporates previously unknown features from the samples 60. In testing the updated rule $R'_i$ in step 622, one or more of a TPR, an FPR, or a number of malware strains matched by the updated rule $R'_i$ are beneficially determined by applying the updated rule $R'_i$ on live samples (different from the samples 60). The results of testing the updated rule $R'_i$ in step 622 are beneficially used in training the classifier applied in step 620.

If the tested updated rule $R'_i$ is found to have a zero or acceptably low FPR and to have a TPR which is relatively high or higher than that of the original rule $R_i$, then the updated rule $R'_i$ is validated and stored in the rule database 26 for further application by the security agent 16. If the tested updated rule $R'_i$ is found to have a non-zero or unacceptably high FPR or to have a TPR which is relatively low or lower than that of the original rule $R_i$, then the updated rule $R'_i$ is discarded. Labeled samples data stored in the labeled sample database 24 can alternatively be rendered available to other system processes in step 624, and actions can be initiated based on the labeled samples data by the other system processes.

Figure 8:
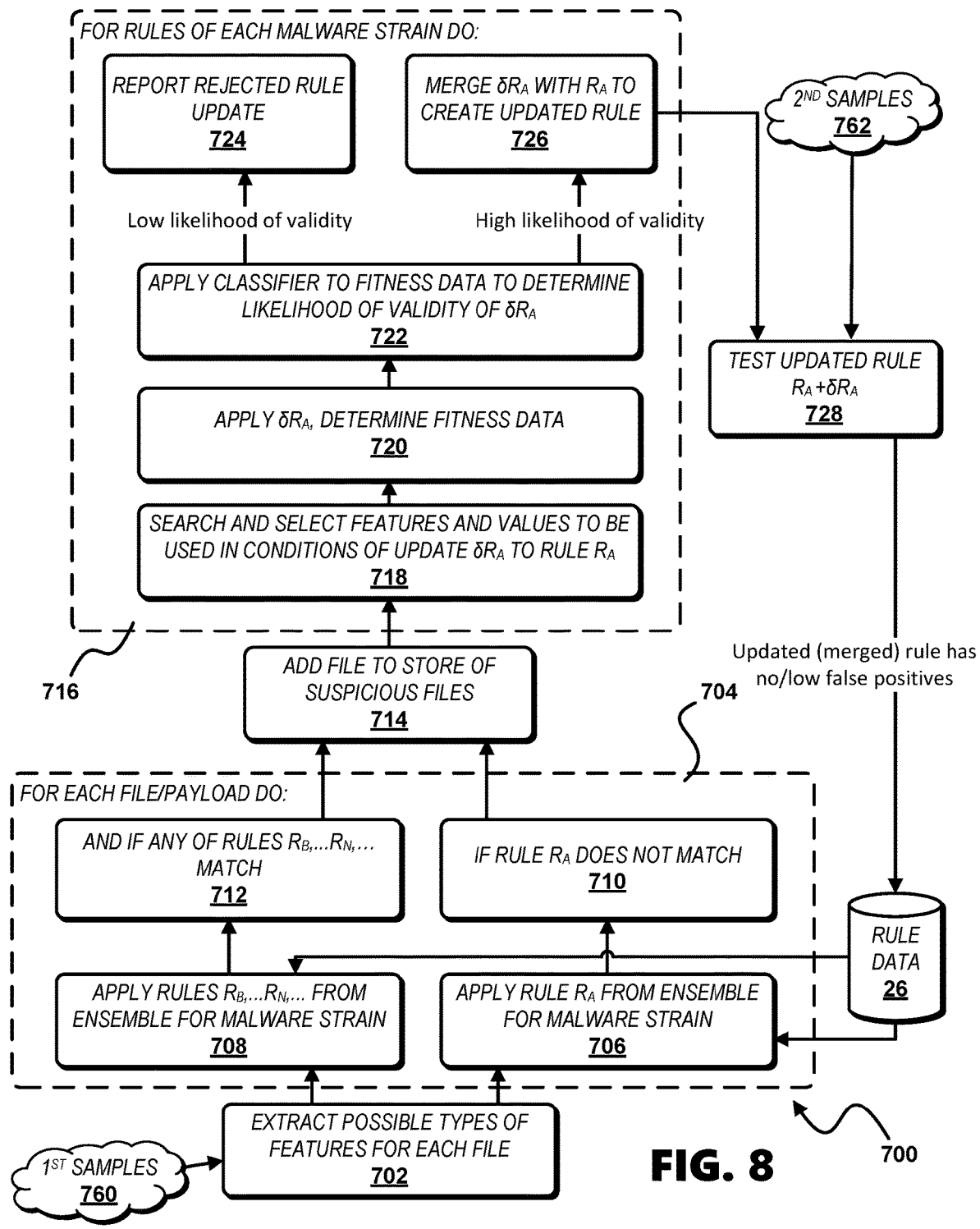

Referring to FIG. 8, yet another method 700 of updating a ruleset used for determining malware threats is disclosed. The method 700 enables an automated workflow to produce rule updates for static rules, dynamic rules, and other rule types. The method 700 is described with reference to the components in the environment 10, and steps of the method 700 can be performed by the security manager 20 via the intelligence engine 30, by the security agent 16 via the computing device 12, or by a combination thereof. Alternatively, the method 700 can be performed via other components in other environments and is not restricted to being implemented by the so described components.

A first plurality of sample data files ("first samples") 760, for example sample executable files stored in the intelligence database 28, are analyzed for example by the intelligence engine 30 to generate updates to sets of rules ("ensembles"), which updated ensembles are stored in the rule database 26. First samples 760 can be gathered by the security agent 16 via monitoring processes on a computing device 12. First samples 760 can further be gathered from the third-party data repositories 72 providing security data and web/app servers 40.

In a step 702, a plurality of features are extracted from each of the first samples 760 (i.e., each file). For example, all known feature types can be extracted for each of the first samples 760. To extract one or more of the plurality of features, the first samples 760 for example can be executed in a sandbox environment. A process grouping 704 describes steps performed for each file, or alternatively each payload of one or more files released by the execution of the one or more files.

In a step 706, a first rule $R_A$ from an ensemble of rules directed to a particular malware strain is applied to extracted features of each of the first samples 760. In a step 708, additional rules $R_B, \ldots R_N, \ldots$ from the ensemble of rules directed to the particular malware strain are applied to extracted features of each of the first samples 760. Each rule can include for example one or more features to be satisfied. When applied to a sample, a rule is either "matched" (i.e., satisfied, the classification is positive) or not matched (i.e., not satisfied, the classification is negative).

For each particular one of the first samples 760, if it is determined that the first rule $R_A$ does not match the particular one of the first samples 760 (step 710) and that one or more of the additional rules $R_B, \ldots R_N, \ldots$ does match the particular one of the first samples (step 712), the particular one of the first samples 760 is added to a store of suspicious files (step 714). Beneficially, the matching ones of the first samples 760 are identified from first samples 760 gathered over a particular finite period of time (e.g., a day, a week, or a month).

A process grouping 716 describes steps performed for each set of rules ("ensemble") directed to a particular malware strain. In a step 718, features and their respective values are searched for in the suspicious files and selected, which features and their respective values are to be used in conditions of a rule update $\delta R_A$ to the first rule $R_A$. For example, features and their respective values can be selected based on a comparison with a predetermined list of features and values or value ranges. Beneficially, the selected features and their respective values include one or more features and their respective values which were not previously used in the first rule $R_A$. More than one prospective rule updates $\delta R_A$ can be generated for the first rule $R_A$ based on a selection of a plurality of features and their respective values.

In a step 720, a generated rule update $\delta R_A$ is applied to particular files for the purpose of validation. The rule update $\delta R_A$ can be applied to the store of suspicious files aggregated in the step 714. Alternatively, the rule update $\delta R_A$ can be applied to the first samples 760. Validation in the step 720 produces data including statistics describing the fitness of the rule update $\delta R_A$ including one or more of a false positive rate ("FPR"), a true positive rate ("TPR"), or a number of malware strains matched by the rule update $\delta R_A$. The data produced are determined based on application of the update $\delta R_A$ to particular files whose security status is known (e.g., malicious files, non-malicious files), wherein the security statuses of the particular files are known based on application of one or more other rules which have been validated.

In a step 722, a classifier is applied to the determined data that describes fitness for the rule update $\delta R_A$ (e.g., FPR, TPR, number of matched malware strains) to determine a likelihood of validity of the rule update $\delta R_A$. An output of the classifier that reflects a low likelihood of validity results in generation of a report including the particular features and corresponding values and data describing fitness for the rule update $\delta R_A$ corresponding to a low likelihood of validity (step 724). Output of the classifier reflecting a high likelihood of validity of the rule update $\delta R_A$ results in step 726 in which the rule update $\delta R_A$ is merged with the first rule $R_A$ to create an updated rule $R_A + \delta R_A$.

The updated rule $R_A + \delta R_A$ is tested on a plurality of sample data files for false positives (step 728) which testing can be used in the training of the classifier applied in step 722. Beneficially, a second plurality of sample data files ("second samples") 762 are used in testing the updated rule. The second samples 762 can include for example live samples gathered in real-time, near real-time, or within some short time period (e.g., a day, a week) by one or more security agents 16 on one or more respective computing devices 12. The testing in step 728 produces data including statistics describing the fitness of a particular updated rule $R_A + \delta R_A$ including one or more of a false positive rate ("FPR"), a true positive rate ("TPR"), or a number of malware strains matched by application of the particular updated rule $R_A + \delta R_A$ to the second samples 762. The data produced are determined based on application of the updated rule $R_A + \delta R_A$ to files (i.e., second samples 762) whose security status is known (e.g., malicious or non-malicious), wherein the security status of the files is known based on application of one or more other previously validated rules (e.g., $R_B, \ldots, R_N \ldots$) to the files. Whether the updated rule $R_A + \delta R_A$ is fit enough to be retained is beneficially based on the false positive rate ("FPR"), the true positive rate ("TPR"), or the number of malware strains matched by the updated rule $R_A + \delta R_A$. If the updated rule $R_A + \delta R_A$ is fit enough, the updated rule is retained in the rule database 26 for further application in the method 100. For example, if the updated rule $R_A + \delta R_A$ is determined to have no false positives, or a low rate of false positives, the updated rule $R_A + \delta R_A$ can be retained. Referring to FIG. 1, updated rules are distributed to computing devices 12 via the security API 32 for use by the security agent 16 in detecting and mitigating malware threats on computing devices 12.

Referring to FIG. 9, a method 800 of generating and applying rules used for determining and mitigating malware threats is disclosed. The method 800 enables an automated workflow to produce rule updates for static and dynamic rules. The method 800 is described with reference to the components in the environment 10, and steps of the method 800 can be performed by the security manager 20 via the intelligence engine 30, by the security agent 16 via the computing device 12, or by a combination thereof. Alternatively, the method 800 can be performed via other components in other environments and is not restricted to being implemented by the so described components.

In a step 802, network communications of one or more computing devices are monitored. A first data file is extracted based on the monitoring of the network communications of the one or more computing devices (step 804). The network communications can include for example one or both of email communications or network downloads. At least a first set of features of the first data file and a second set of features of the first data file are extracted (step 806).

For example, the first set of features can include two or more features. Further, the second set of features can include two or more features.

A first rule is applied to the first set of features of the first data file to determine a non-match by the first rule to the first set of features of the first data file (step 808). The determination of the non-match by the first rule to the first set of features of the first data file can include for example determining a presence of less than two features of the second set of features that satisfy respective particular conditions.

A second rule is applied to the second set of features of the first data file to determine a match by the second rule to the second set of features of the first data file (step 810). The determination of the match by the second rule to the second set of features of the first data file can include for example determining a presence of two or more features of the second set of features that respectively satisfy two or more particular conditions. Determining the presence of the two or more features of the second set of features that respectively satisfy the two or more particular conditions can include determining a first value of a first feature of the second set of features to be within a first particular range, and determining a second value of a second feature of the second set of features to be within a second particular range. Alternatively, determining the presence of the two or more features of the second set of features that respectively satisfy the two or more particular conditions can include determining a first value of a first feature of the second set of features to be exactly the same as a first particular value, and determining a second value of a second feature of the second set of features to be exactly the same as a second particular value.

A third rule is generated based at least on the first set of features of the first data file, the determination of the non-match by the first rule to the first set of features of the first data file, and the determination of the match by the second rule to the second set of features of the first data file (step 812). Extracting the first set of features of the first data file can include extracting a first plurality of features and a respective first plurality of values of the first plurality of features, and generating the third rule based on the first set of features of the first data file can include generating the third rule at least based on a particular feature and a respective particular value of the particular feature of the first set of features of the first data file. Further, generating the third rule based on the first set of features of the first data file can include generating the third rule at least based on a first particular feature and a respective first particular value of the first particular feature of the first set of features of the first data file and on a second particular feature and a respective second particular value of the second particular feature of the first set of features of the first data file. Extracting the second set of features of the first data file can include extracting a second plurality of features and a respective second plurality of values of the second plurality of features, and determining the match by the second rule to the second set of features of the first data file can include at least determining that a particular value of a particular feature satisfies a particular condition. In an extension to the method 800, a third set of features of the first data file can be extracted, a fourth rule can be applied to the third set of features of the first data file to determine a match by the fourth rule to the third set of features of the first data file, and the third rule can be generated further based on the determination of the match by the fourth rule.

In a step 814, network communications of a particular computing device are monitored. The one or more computing devices can include the particular computing device, and the steps of extracting the first data file, extracting the at least the first set of features of the first data file and the second set of features of the first data file, applying the first rule to the first set of features of the first data file, applying the second rule to the second set of features of the first data file, generating the third rule, and monitoring the network communications of the particular computing device can be performed by the particular computing device.

A second data file is extracted based on the monitoring of the network communications of the particular computing device (step 816), and at least a first set of features of the second data file are extracted (step 818). The third rule is applied to the first set of features of the second data file to determine a match by the third rule to the first set of features of the second data file (step 820). In a particular implementation, the third rule and the first rule are merged to create a merged rule, wherein the application of the third rule includes applying the merged rule to the first set of features of the second data file to determine the match by the third rule to the first set of features of the second data file. The second data file is one or more of disabled, blocked, or deleted via the particular computing device based on the determination of the match by the third rule to the first set of features of the second data file (step 822).

In a particular implementation of the method 800, the first data file can include a first executable file, and the second data file can include a second executable file. The first data file can be executed and the first set of features of the first data file can be determined based on the execution of the first data file. The second data file can be executed, and the first set of features of the second data file can be determined based on the execution of the second data file.

In an extension to the method 800, the one or more computing devices include a first computing device, and the particular computing device includes a second computing device. A network-connected computing system is provided, the extracting of the first data file is performed by the first computing device, and the first data file is received by the network-connected computing system via a network. The network-connected computing system performs the extracting of the at least the first set of features of the first data file and the second set of features of the first data file, the applying of the first rule to the first set of features, the applying of the second rule to the second set of features, and the generating of the third rule by the network-connected computing system. The second computing device receives the third rule from the network-connected computing system, and the network communications of the particular computing device are monitored by the particular computing device.

In a further extension to the method 800, a third data file is extracted based on the monitoring of the one or more computing devices. At least a first set of features of the third data file and a second set of features of the third data file are extracted. The third rule is applied to the first set of features of the third data file to determine a match by the third rule to the first set of features of the third data file. The second rule is applied to the second set of features of the third data file to determine a match by the second rule to the second set of features of the third data file. The third rule is validated at least based on the determination of the match by the third rule to the first set of features of the third data file and the match by the second rule to the second set of features of the third data file, and the third rule is applied to the first set of features of the second data file to determine the match by the third rule to the first set of features of the second data file based on the validation of the third rule.

In a further extension to the method 800, particular data files are extracted based on the monitoring of the one or more computing devices. A plurality of sets of features of each of the particular data files are extracted. Particular rules are applied to the plurality of sets of features of each of the particular data files to determine a plurality of matches by the particular rules to the plurality of sets of features of the particular data files and a plurality of non-matches by the particular rules to the plurality of sets of features of the particular data files. For each of the particular data files a particular set of features of each of the particular data files are extracted. The third rule is applied to the particular set of features of each of the particular data files to determine a plurality of matches by the third rule to the particular set of features of the particular data files and a plurality of non-matches by the third rule to the particular set of features of the particular data files. The plurality of matches by the third rule to the particular set of features of the particular data files and the plurality of non-matches by the third rule to the plurality of sets of features of the particular data files are compared to the plurality of matches by the particular rules to the plurality of sets of features of the particular data files and the plurality of non-matches by the particular rules to the plurality of sets of features of the particular data files to validate the third rule. The third rule is applied to the first set of features of the second data file to determine the match by the third rule to the first set of features of the second data file at least based on the validation of the third rule.

In a further extension to the method 800, the third rule and the first rule are merged to create a merged rule. Network communications of one or more computing systems are monitored. Certain data files are extracted based on the monitoring of the network communications of the one or more computing systems. A plurality of sets of features of each of the certain data files are extracted. Certain rules are applied to the plurality of sets of features of each of the certain data files to determine a plurality of matches by the certain rules to the plurality of sets of features of the certain data files and a plurality of non-matches by the certain rules to the plurality of sets of features of the certain data files. For each of the certain data files a certain set of features of each of the certain data files are extracted. The merged rule is applied to the certain set of features of each of the certain data files to determine a plurality of matches by the merged rule to the certain set of features of the certain data files and a plurality of non-matches by the merged rule to the certain set of features of the certain data files. The plurality of matches by the merged rule to the certain set of features of the certain data files and the plurality of non-matches by the merged rule to the certain set of features of the certain data files are compared to the plurality of matches by the certain rules to the plurality of sets of features of the certain data files and the plurality of non-matches by the certain rules to the plurality of sets of features of the certain data files to validate the merged rule. Based on the validation of the merged rule, the merged rule is applied to the first set of features of the second data file to determine the match by the third rule to the first set of features of the second data file.

In a further extension to the method 800, particular data files are extracted based on the monitoring of the one or more computing devices. A plurality of sets of features of each of the particular data files are extracted. Particular matches for the plurality of sets of features of the particular data files and particular non-matches for the plurality of sets of features of the particular data files are determined. For each of the particular data files a particular set of features of each of the particular data files are extracted. The third rule is applied to the particular set of features of each of the particular data files to determine a plurality of matches by the third rule to the particular set of features of the particular data files and a plurality of non-matches by the third rule to the particular set of features of the particular data files. The plurality of matches by the third rule to the particular set of features of the particular data files and the plurality of non-matches by the third rule to the plurality of sets of features of the particular data files are compared to the particular matches and the particular non-matches to validate the third rule. The third rule is applied to the first set of features of the second data file to determine the match by the third rule to the first set of features of the second data file at least based on the validation of the third rule.

In a further extension to the method 800, the third rule and the first rule are merged to create a merged rule. Network communications of one or more computing systems are monitored, and certain data files are extracted based on the monitoring of the network communications of the one or more computing systems. A plurality of sets of features of each of the certain data files are extracted. Certain matches for the plurality of sets of features of the certain data files and certain non-matches for the plurality of sets of features of the certain data files are determined. For each of the certain data files a certain set of features of each of the certain data files are extracted. The merged rule is applied to the certain set of features of each of the certain data files to determine a plurality of matches by the merged rule to the certain set of features of the certain data files and a plurality of non-matches by the merged rule to the certain set of features of the certain data files. The plurality of matches by the merged rule to the certain set of features of the certain data files and the plurality of non-matches by the merged rule to the certain set of features of the certain data files are compared to the certain matches and the certain non-matches to validate the merged rule. Based on the validation of the merged rule, the merged rule is applied to the first set of features of the second data file to determine the match by the third rule to the first set of features of the second data file.

In a further extension to the method 800, particular data files are extracted based on the monitoring of the one or more computing devices. A first set of the particular data files are labeled as matched and a second set of the particular data files are labeled as non-matched. For each of the particular data files a particular set of features of each of the particular data files is extracted. The third rule is applied to the particular set of features of each of the particular data files to determine a plurality of matches by the third rule to the particular set of features of the particular data files. The plurality of matches by the third rule to the particular set of features of the particular data files are compared to the first set of the particular data files labeled as matched to determine a first true positive rate ("TPR"). The plurality of matches by the third rule to the particular set of features of the particular data files are compared to the second set of the particular data files labeled as non-matched to determine a first false positive rate ("FPR"). The third rule is validated at least based on the first TPR and the first FPR. The third rule is applied to the first set of features of the second data file to determine the match by the third rule to the first set of features of the second data file at least based on the validation of the third rule. In a further extension, the third rule and the first rule are merged to create a merged rule. Network communications of one or more computing system are monitored. Certain data files are extracted based on the monitoring of the network communications of the one or more computing systems. A first set of the certain data files are labeled as matched and a second set of the certain data files are labeled as non-matched. For each of the certain data files a particular set of features of each of the certain data files is extracted. The merged rule is applied to the particular set of features of each of the certain data files to determine a plurality of matches by the merged rule to the particular set of features of the certain data files. The plurality of matches by the merged rule to the particular set of features of the certain data files are compared to the first set of the certain data files labeled as matched to determine a second true positive rate ("TPR"). The plurality of matches by the merged rule to the particular set of features of the certain data files are compared to the second set of the certain data files labeled as non-matched to determine a second false positive rate ("FPR"). The merged rule is validated at least based on the second TPR and the second FPR. At least based on the validation of the merged rule, the merged rule is applied to the first set of features of the second data file to determine the match by the third rule to the first set of features of the second data file. In a further extension, validating the third rule can be based on the number of the plurality of matches by the third rule to the particular set of features of the particular data files. In a further extension, the particular data files can correspond to a plurality of malware strains, and the third rule can be validated based on the number of the plurality malware strains of the plurality of matches by the third rule to the particular set of features of the particular data files. In a further extension, particular rules can be applied to the particular data files to label the first set of the particular data files as matched and a second set of the particular data files as non-matched.

In a further extension to the method 800, particular data files are extracted based on the monitoring of the one or more computing devices. A plurality of sets of features of each of the particular data files are extracted. Particular rules are applied to the plurality of sets of features of each of the particular data files to determine a plurality of matches by the particular rules to the plurality of sets of features of the particular data files and a plurality of non-matches by the particular rules to the plurality of sets of features of the particular data files. For each of the particular data files a particular set of features of each of the particular data files are extracted. The third rule is applied to the particular set of features of each of the particular data files to determine a plurality of matches by the third rule to the particular set of features of the particular data files. The plurality of matches by the third rule to the particular set of features of the particular data files are compared to the plurality of matches by the particular rules to the plurality of sets of features of the particular data files and the plurality of non-matches by the particular rules to the plurality of sets of features of the particular data files to validate the third rule. The third rule is applied to the first set of features of the second data file to determine the match by the third rule to the first set of features of the second data file at least based on the validation of the third rule. In a further extension, the third rule and the first rule are merged to create a merged rule. Network communications of one or more computing systems are monitored. Certain data files are extracted based on the monitoring of the network communications of the one or more computing systems. A plurality of sets of features of each of the certain data files are extracted. Certain rules are applied to the plurality of sets of features of each of the certain data files to determine a plurality of matches by the certain rules to the plurality of sets of features of the certain data files and a plurality of non-matches by the certain rules to the plurality of sets of features of the certain data files. For each of the certain data files a certain set of features of each of the certain data files are extracted. The merged rule is applied to the certain set of features of each of the certain data files to determine a plurality of matches by the merged rule to the certain set of features of the certain data files. The plurality of matches by the merged rule to the certain set of features of the certain data files to the plurality of matches by the certain rules to the plurality of sets of features of the certain data files and the plurality of non-matches by the certain rules to the plurality of sets of features of the certain data files to validate the merged rule. At least based on the validation of the merged rule, the merged rule is applied to the first set of features of the second data file to determine the match by the third rule to the first set of features of the second data file.

In a further extension to the method 800, the third rule and the first rule are merged to create a merged rule. Network communications of one or more computing systems are monitored, and certain data files are extracted based on the monitoring of the network communications of the one or more computing systems. A plurality of sets of features of each of the certain data files are extracted. Certain rules are applied to the plurality of sets of features of each of the certain data files to determine a plurality of matches by the certain rules to the plurality of sets of features of the certain data files and a plurality of non-matches by the certain rules to the plurality of sets of features of the certain data files. For each of the certain data files a particular set of features of each of the certain data files is extracted. The merged rule is applied to the particular set of features of each of the certain data files to determine a plurality of matches by the merged rule to the particular set of features of the certain data files and a plurality of non-matches by the merged rule to the particular set of features of the certain data files. The plurality of matches by the merged rule to the particular set of features of the certain data files and the plurality of non-matches by the merged rule to the particular set of features of the certain data files are compared to the plurality of matches by the certain rules to the plurality of sets of features of the certain data files and the plurality of non-matches by the certain rules to the plurality of sets of features of the certain data files to validate the merged rule. Based on the validation of the merged rule, the merged rule is applied to the first set of features of the second data file to determine the match by the third rule to the first set of features of the second data file.

In a further extension to the method 800, the third rule and the first rule are merged to create a merged rule. Network communications of one or more computing systems are monitored, and certain data files are extracted based on the monitoring of the network communications of the one or more computing systems. Certain rules are applied to the certain data files to label a first set of the certain data files as matched and a second set of the certain data files as non-matched. For each of the certain data files a particular set of features of each of the certain data files is extracted. The merged rule is applied to the particular set of features of each of the certain data files to determine a plurality of matches by the merged rule to the particular set of features of the certain data files. The plurality of matches by the merged rule to the particular set of features of the certain data files are compared to the first set of the certain data files labeled as matched to determine a true positive rate ("TPR"). The plurality of matches by the merged rule to the particular set of features of the certain data files are compared to the second set of the certain data files labeled as non-matched to determine a false positive rate ("FPR"). The merged rule is validated at least based on the TPR and the FPR. Based on the validation of the merged rule, the merged rule is applied to the first set of features of the second data file to determine the match by the third rule to the first set of features of the second data file.

In a further extension to the method 800, the third rule and the first rule are merged to create a merged rule. Network communications of one or more computing systems are monitored, and certain data files are extracted based on the monitoring of the network communications of the one or more computing systems. A plurality of sets of features of each of the certain data files are extracted. Certain rules are applied to the plurality of sets of features of each of the certain data files to determine a plurality of matches by the certain rules to the plurality of sets of features of the certain data files and a plurality of non-matches by the certain rules to the plurality of sets of features of the certain data files. For each of the certain data files a particular set of features of each of the certain data files are extracted. The merged rule is applied to the particular set of features of each of the certain data files to determine a plurality of matches by the merged rule to the particular set of features of the certain data files. The plurality of matches by the merged rule to the particular set of features of the certain data files are compared to the plurality of matches by the certain rules to the plurality of sets of features of the certain data files and the plurality of non-matches by the certain rules to the plurality of sets of features of the certain data files to validate the merged rule. Based on the validation of the merged rule, the merged rule is applied to the first set of features of the second data file to determine the match by the third rule to the first set of features of the second data file.

Referring to FIG. 10, yet another method 900 of generating and applying rules used for determining and mitigating malware threats is disclosed. The method 900 enables an automated workflow to produce rule updates for static and dynamic rules. The method 900 is described with reference to the components in the environment 10, and steps of the method 900 can be performed by the security manager 20 via the intelligence engine 30, by the security agent 16 via the computing device 12, or by a combination thereof. Alternatively, the method 900 can be performed via other components in other environments and is not restricted to being implemented by the so described components.

In a step 902, network communications of one or more computing devices are monitored. A first data file is extracted based on the monitoring of the network communications of the one or more computing devices (step 904). At least a first set of features of the first data file and a second set of features of the first data file are extracted (step 906). A particular non-match to the first set of features of the first data file is determined (step 908). A particular match to the second set of features of the first data file is determined (step 910).

Network communications of a particular computing device are monitored (step 912). A second data file is extracted based on the monitoring of the network communications of the particular computing device (step 914). At least a first set of features of the second data file is extracted (step 916). A match to the first set of features of the second data file is determined based at least on the first set of features of the first data file, the determination of the particular non-match, and the determination of the particular match (step 918). The method 900 further includes one or more of alerting regarding, reporting, disabling, blocking, or deleting the second data file via the particular computing device based on the determination of the match to the first set of features of the second data file (step 920).

In an extension to the method 900, a classification process is established based at least on the first set of features of the first data file, the determination of the particular non-match to the first set of features of the first data file, and the determination of the particular match to the second set of features of the first data file, and the classification process can be applied to the first set of features of the second data file to determine the match to the first set of features of the second data file. The classification process can include for example applying one or more rules. Particular data files are extracted based on the monitoring of the network communications of the one or more computing devices. A plurality of sets of features of each of the particular data files are extracted. Particular matches to the plurality of sets of features of the particular data files are determined, and particular non-matches to the plurality of sets of features of the particular data files are determined. For each of the particular data files a particular set of features of each of the particular data files is extracted. By the classification process, a plurality of matches to the particular set of features of the particular data files are determined, and by the classification process, a plurality of non-matches to the particular set of features of the particular data files are determined. The plurality of matches by the classification process to the particular set of features of the particular data files and the plurality of non-matches by the classification process to the particular set of features of the particular data files are compared to the particular matches to the plurality of sets of features of the particular data files and the particular non-matches to the plurality of sets of features of the particular data files to validate the classification process. The classification process is applied to the first set of features of the second data file to determine the match to the first set of features of the second data file at least based on the validation of the classification process.

Referring to FIG. 11, yet another method 1000 of updating rules used for determining and mitigating malware threats is disclosed. The method 1000 enables an automated workflow to produce rule updates for static and dynamic rules. The method 1000 is described with reference to the components in the environment 10, and steps of the method 1000 can be performed by the security manager 20 via the intelligence engine 30, by the security agent 16 via the computing device 12, or by a combination thereof. Alternatively, the method 1000 can be performed via other components in other environments and is not restricted to being implemented by the so described components.

In a step 1002 network communications of one or more computing devices are monitored. A first data file is extracted based on the monitoring of the network communications of the one or more computing devices (step 1004). At least a first set of features of the first data file and a second set of features of the first data file are extracted (step 1006). A first rule is applied to the first set of features of the first data file to determine a non-match by the first rule to the first set of features of the first data file (step 1008). A second rule is applied to the second set of features of the first data file to determine a match by the second rule to the second set of features of the first data file (step 1010). A third rule is generated based at least on the first set of features of the first data file, the determination of the non-match by the first rule to the first set of features of the first data file, and the determination of the match by the second rule to the second set of features of the first data file (step 1012). The third rule and the first rule are merged to create a merged rule (step 1014). Network communications of a particular computing device are monitored (step 1016). A second data file is extracted based on the monitoring of the network communications of the particular computing device (step 1018). At least a first set of features of the second data file is extracted (step 1020). The merged rule is applied to the first set of features of the second data file to determine a match by the merged rule to the first set of features of the second data file (step 1022). The method 1000 further includes one or more of disabling, blocking, or deleting the second data file via the particular computing device based on the determination of the match by the merged rule to the first set of features of the second data file (step 1024).

In an extension to the method 1000, particular data files are extracted based on the monitoring of the one or more computing devices. A plurality of sets of features of each of the particular data files are extracted. Particular rules are applied to the plurality of sets of features of each of the particular data files to determine a plurality of matches by the particular rules to the plurality of sets of features of the particular data files and a plurality of non-matches by the particular rules to the plurality of sets of features of the particular data files. For each of the particular data files a particular set of features of each of the particular data files is extracted. The third rule is applied to the particular set of features of each of the particular data files to determine a plurality of matches by the third rule to the particular set of features of the particular data files. The plurality of matches by the third rule to the particular set of features of the particular data files are compared to the plurality of matches by the particular rules to the plurality of sets of features of the particular data files and the plurality of non-matches by the particular rules to the plurality of sets of features of the particular data files to validate the third rule, and the third rule is merged to the first rule at least based on the validation of the third rule. In a further extension, network communications of one or more computing systems are monitored. Certain data files are extracted based on the monitoring of the network communications of the one or more computing systems. A plurality of sets of features of each of the certain data files are extracted. Certain rules are applied to the plurality of sets of features of each of the certain data files to determine a plurality of matches by the certain rules to the plurality of sets of features of the certain data files and a plurality of non-matches by the certain rules to the plurality of sets of features of the certain data files. For each of the certain data files a particular set of features of each of the certain data files is extracted. The merged rule is applied to the particular set of features of each of the certain data files to determine a plurality of matches by the merged rule to the particular set of features of the certain data files and a plurality of non-matches by the merged rule to the particular set of features of the certain data files. The plurality of matches by the merged rule to the particular set of features of the certain data files and the plurality of non-matches by the merged rule to the particular set of features of the certain data files are compared to the plurality of matches by the certain rules to the plurality of sets of features of the certain data files and the plurality of non-matches by the certain rules to the plurality of sets of features of the certain data files to validate the merged rule. The merged rule is applied to the first set of features of the second data file to determine the match by the merged rule to the first set of features of the second data file based on the validation of the merged rule.

In a further extension to the method 1000, particular data files are extracted based on the monitoring of the one or more computing devices. A first set of the particular data files are labeled as matched and a second set of the particular data files are labeled as non-matched. For each of the particular data files a particular set of features of each of the particular data files is extracted. The third rule is applied to the particular set of features of each of the particular data files to determine a plurality of matches by the third rule to the particular set of features of the particular data files. The plurality of matches by the third rule to the particular set of features of the particular data files are compared to the first set of the particular data files labeled as matched to determine a first true positive rate ("TPR"). The plurality of matches by the third rule to the particular set of features of the particular data files are compared to the second set of the particular data files labeled as non-matched to determine a first false positive rate ("FPR"). The third rule is validated at least based on the first TPR and the first FPR, and the third rule is merged to the first rule at least based on the validation of the third rule. In a further extension, network communications of one or more computing systems are monitored. Certain data files are extracted based on the monitoring of the network communications of the one or more computing systems. A first set of the certain data files are labeled as matched and a second set of the certain data files are labeled as non-matched. For each of the certain data files a particular set of features of each of the certain data files is extracted. The merged rule is applied to the particular set of features of each of the certain data files to determine a plurality of matches by the merged rule to the particular set of features of the certain data files. The plurality of matches by the merged rule to the particular set of features of the certain data files are compared to the first set of the certain data files labeled as matched to determine a second true positive rate ("TPR"). The plurality of matches by the merged rule to the particular set of features of the certain data files are compared to the second set of the certain data files labeled as non-matched to determine a second false positive rate ("FPR"). The merged rule is validated at least based on the second TPR and the second FPR. The merged rule is applied to the first set of features of the second data file to determine the match by the merged rule to the first set of features of the second data file at least based on the validation of the merged rule.

FIG. 12 illustrates in abstract the function of an exemplary computer system 2000 on which the systems, methods and processes described herein can execute. For example, the computing device 12 and the security manager 20 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
monitoring network communications of at least one computing device;
extracting a first data file based on the monitoring of the network communications of the at least one computing device;
extracting at least a first set of features of the first data file and a second set of features of the first data file;
applying a first rule to the first set of features of the first data file to determine a non-match by the first rule to the first set of features of the first data file;
applying a second rule to the second set of features of the first data file to determine a match by the second rule to the second set of features of the first data file;
generating a third rule based at least on the first set of features of the first data file, the determination of the non-match by the first rule to the first set of features of the first data file, and the determination of the match by the second rule to the second set of features of the first data file;
monitoring network communications of a particular computing device;
extracting a second data file based on the monitoring of the network communications of the particular computing device;
extracting at least a first set of features of the second data file;
applying the third rule to the first set of features of the second data file to determine a match by the third rule to the first set of features of the second data file; and
at least one of disabling, blocking, or deleting the second data file via the particular computing device based on the determination of the match by the third rule to the first set of features of the second data file.

2. The method of claim 1, wherein:
extracting the first set of features of the first data file comprises extracting a first plurality of features and a respective first plurality of values of the first plurality of features; and
generating the third rule based on the first set of features of the first data file comprises generating the third rule at least based on a particular feature and a respective particular value of the particular feature of the first set of features of the first data file.

3. The method of claim 1, wherein:
extracting the first set of features of the first data file comprises extracting a first plurality of features and a respective first plurality of values of the first plurality of features; and
generating the third rule based on the first set of features of the first data file comprises generating the third rule at least based on a first particular feature and a respective first particular value of the first particular feature of the first set of features of the first data file and on a second particular feature and a respective second particular value of the second particular feature of the first set of features of the first data file.

4. The method of claim 1, wherein:
extracting the second set of features comprises extracting a second plurality of features and a respective second plurality of values of the second plurality of features; and
determining the match by the second rule to the second set of features of the first data file comprises at least determining that a particular value of a particular feature satisfies a particular condition.

5. The method of claim 1, wherein:
the at least one computing device comprises the particular computing device; and
the steps of extracting the first data file, extracting the at least the first set of features of the first data file and the second set of features of the first data file, applying the first rule, applying the second rule, generating the third rule, and monitoring the network communications of the particular computing device are performed by the particular computing device.

6. The method of claim 1, wherein:
the at least one computing device comprises a first computing device; and
the particular computing device comprises a second computing device;
the method further comprising:
providing a network-connected computing system;
performing the extracting of the first data file by the first computing device;
receiving by the network-connected computing system the first data file via a network;
performing by the network-connected computing system the extracting of the at least the first set of features of the first data file and the second set of features of the first data file, the applying of the first rule, the applying of the second rule, and the generating of the third rule by the network-connected computing system;
receiving by the second computing device the third rule from the network-connected computing system; and
monitoring the network communications of the particular computing device by the particular computing device.

7. The method of claim 1, further comprising:
extracting a third set of features of the first data file;
applying a fourth rule to the third set of features of the first data file to determine a match by the fourth rule to the third set of features of the first data file; and
generating the third rule further based on the determination of the match by the fourth rule.

8. The method of claim 1, wherein the first set of features of the first data file comprises at least two features.

9. The method of claim 1, further comprising:
extracting a third data file based on the monitoring of the at least one computing device;
extracting at least a first set of features of the third data file and a second set of features of the third data file;
applying the third rule to the first set of features of the third data file to determine a match by the third rule to the first set of features of the third data file;
applying the second rule to the second set of features of the third data file to determine a match by the second rule to the second set of features of the third data file;
validating the third rule at least based on the determination of the match by the third rule to the first set of features of the third data file and the match by the second rule to the second set of features of the third data file; and
applying the third rule to the first set of features of the second data file to determine the match by the third rule to the first set of features of the second data file based on the validation of the third rule.

10. The method of claim 1, further comprising:
extracting particular data files based on the monitoring of the at least one computing device;
extracting a plurality of sets of features of each of the particular data files;
applying particular rules to the plurality of sets of features of each of the particular data files to determine a plurality of matches by the particular rules to the plurality of sets of features of the particular data files and a plurality of non-matches by the particular rules to the plurality of sets of features of the particular data files;
extracting for each of the particular data files a particular set of features of each of the particular data files;
applying the third rule to the particular set of features of each of the particular data files to determine a plurality of matches by the third rule to the particular set of features of the particular data files and a plurality of non-matches by the third rule to the particular set of features of the particular data files;
comparing the plurality of matches by the third rule to the particular set of features of the particular data files and the plurality of non-matches by the third rule to the plurality of sets of features of the particular data files to the plurality of matches by the particular rules to the plurality of sets of features of the particular data files and the plurality of non-matches by the particular rules to the plurality of sets of features of the particular data files to validate the third rule; and
applying the third rule to the first set of features of the second data file to determine the match by the third rule to the first set of features of the second data file at least based on the validation of the third rule.

11. The method of claim 10, further comprising:
merging the third rule and the first rule to create a merged rule;
monitoring network communications of at least one computing system;
extracting certain data files based on the monitoring of the network communications of the at least one computing system;
extracting a plurality of sets of features of each of the certain data files;
applying certain rules to the plurality of sets of features of each of the certain data files to determine a plurality of matches by the certain rules to the plurality of sets of features of the certain data files and a plurality of non-matches by the certain rules to the plurality of sets of features of the certain data files;
extracting for each of the certain data files a certain set of features of each of the certain data files;
applying the merged rule to the certain set of features of each of the certain data files to determine a plurality of matches by the merged rule to the certain set of features of the certain data files and a plurality of non-matches by the merged rule to the certain set of features of the certain data files;
comparing the plurality of matches by the merged rule to the certain set of features of the certain data files and the plurality of non-matches by the merged rule to the certain set of features of the certain data files to the plurality of matches by the certain rules to the plurality of sets of features of the certain data files and the plurality of non-matches by the certain rules to the plurality of sets of features of the certain data files to validate the merged rule; and
applying, based on the validation of the merged rule, the merged rule to the first set of features of the second data file to determine the match by the third rule to the first set of features of the second data file.

12. The method of claim 1, further comprising:
extracting particular data files based on the monitoring of the at least one computing device;
extracting a plurality of sets of features of each of the particular data files;
determining particular matches for the plurality of sets of features of the particular data files and particular non-matches for the plurality of sets of features of the particular data files;
extracting for each of the particular data files a particular set of features of each of the particular data files;
applying the third rule to the particular set of features of each of the particular data files to determine a plurality of matches by the third rule to the particular set of features of the particular data files and a plurality of non-matches by the third rule to the particular set of features of the particular data files;
comparing the plurality of matches by the third rule to the particular set of features of the particular data files and the plurality of non-matches by the third rule to the plurality of sets of features of the particular data files to the particular matches and the particular non-matches to validate the third rule; and
applying the third rule to the first set of features of the second data file to determine the match by the third rule to the first set of features of the second data file at least based on the validation of the third rule.

13. The method of claim 1, further comprising:
merging the third rule and the first rule to create a merged rule;
monitoring network communications of at least one computing system;
extracting certain data files based on the monitoring of the network communications of the at least one computing system;

extracting a plurality of sets of features of each of the certain data files;
determining certain matches for the plurality of sets of features of the certain data files and certain non-matches for the plurality of sets of features of the certain data files;
extracting for each of the certain data files a certain set of features of each of the certain data files;
applying the merged rule to the certain set of features of each of the certain data files to determine a plurality of matches by the merged rule to the certain set of features of the certain data files and a plurality of non-matches by the merged rule to the certain set of features of the certain data files;
comparing the plurality of matches by the merged rule to the certain set of features of the certain data files and the plurality of non-matches by the merged rule to the certain set of features of the certain data files to the certain matches and the certain non-matches to validate the merged rule; and
applying, based on the validation of the merged rule, the merged rule to the first set of features of the second data file to determine the match by the third rule to the first set of features of the second data file.

14. The method of claim 1, further comprising:
extracting particular data files based on the monitoring of the at least one computing device;
labeling a first set of the particular data files as matched and a second set of the particular data files as non-matched;
extracting for each of the particular data files a particular set of features of each of the particular data files;
applying the third rule to the particular set of features of each of the particular data files to determine a plurality of matches by the third rule to the particular set of features of the particular data files;
comparing the plurality of matches by the third rule to the particular set of features of the particular data files to the first set of the particular data files labeled as matched to determine a first true positive rate ("TPR");
comparing the plurality of matches by the third rule to the particular set of features of the particular data files to the second set of the particular data files labeled as non-matched to determine a first false positive rate ("FPR");
validating the third rule at least based on the first TPR and the first FPR; and
applying the third rule to the first set of features of the second data file to determine the match by the third rule to the first set of features of the second data file at least based on the validation of the third rule.

15. The method of claim 14, further comprising:
merging the third rule and the first rule to create a merged rule;
monitoring network communications of at least one computing system;
extracting certain data files based on the monitoring of the network communications of the at least one computing system;
labeling a first set of the certain data files as matched and a second set of the certain data files as non-matched;
extracting for each of the certain data files a particular set of features of each of the certain data files;
applying the merged rule to the particular set of features of each of the certain data files to determine a plurality of matches by the merged rule to the particular set of features of the certain data files;
comparing the plurality of matches by the merged rule to the particular set of features of the certain data files to the first set of the certain data files labeled as matched to determine a second true positive rate ("TPR");
comparing the plurality of matches by the merged rule to the particular set of features of the certain data files to the second set of the certain data files labeled as non-matched to determine a second false positive rate ("FPR");
validating the merged rule at least based on the second TPR and the second FPR; and
applying, at least based on the validation of the merged rule, the merged rule to the first set of features of the second data file to determine the match by the third rule to the first set of features of the second data file.

16. The method of claim 14, further comprising validating the third rule based on the number of the plurality of matches by the third rule to the particular set of features of the particular data files.

17. The method of claim 14, wherein the particular data files correspond to a plurality of malware strains, the method further comprising validating the third rule based on the number of the plurality malware strains of the plurality of matches by the third rule to the particular set of features of the particular data files.

18. The method of claim 14, further comprising applying particular rules to the particular data files to label the first set of the particular data files as matched and a second set of the particular data files as non-matched.

19. The method of claim 1, further comprising:
extracting particular data files based on the monitoring of the at least one computing device;
extracting a plurality of sets of features of each of the particular data files;
applying particular rules to the plurality of sets of features of each of the particular data files to determine a plurality of matches by the particular rules to the plurality of sets of features of the particular data files and a plurality of non-matches by the particular rules to the plurality of sets of features of the particular data files;
extracting for each of the particular data files a particular set of features of each of the particular data files;
applying the third rule to the particular set of features of each of the particular data files to determine a plurality of matches by the third rule to the particular set of features of the particular data files;
comparing the plurality of matches by the third rule to the particular set of features of the particular data files to the plurality of matches by the particular rules to the plurality of sets of features of the particular data files and the plurality of non-matches by the particular rules to the plurality of sets of features of the particular data files to validate the third rule; and
applying the third rule to the first set of features of the second data file to determine the match by the third rule to the first set of features of the second data file at least based on the validation of the third rule.

20. The method of claim 19, further comprising:
merging the third rule and the first rule to create a merged rule;
monitoring network communications of at least one computing system;
extracting certain data files based on the monitoring of the network communications of the at least one computing system;

extracting a plurality of sets of features of each of the certain data files;

applying certain rules to the plurality of sets of features of each of the certain data files to determine a plurality of matches by the certain rules to the plurality of sets of features of the certain data files and a plurality of non-matches by the certain rules to the plurality of sets of features of the certain data files;

extracting for each of the certain data files a certain set of features of each of the certain data files;

applying the merged rule to the certain set of features of each of the certain data files to determine a plurality of matches by the merged rule to the certain set of features of the certain data files;

comparing the plurality of matches by the merged rule to the certain set of features of the certain data files to the plurality of matches by the certain rules to the plurality of sets of features of the certain data files and the plurality of non-matches by the certain rules to the plurality of sets of features of the certain data files to validate the merged rule; and applying, at least based on the validation of the merged rule, the merged rule to the first set of features of the second data file to determine the match by the third rule to the first set of features of the second data file.

21. The method of claim 1, wherein the determination of the match by the second rule to the second set of features of the first data file comprises determining a presence of at least two features of the second set of features that respectively satisfy at least two particular conditions.

22. The method of claim 21, wherein determining the presence of the at least two features of the second set of features that respectively satisfy the at least two particular conditions comprises:
determining a first value of a first feature of the second set of features to be within a first particular range; and
determining a second value of a second feature of the second set of features to be within a second particular range.

23. The method of claim 1, wherein the determination of the non-match by the first rule to the first set of features of the first data file comprises determining a presence of less than two features of the second set of features that satisfy respective particular conditions.

24. The method of claim 1, wherein the network communications comprise at least one of email communications or network downloads.

25. The method of claim 1, wherein:
the first data file comprises a first executable file; and
the second data file comprises a second executable file.

26. The method of claim 25, further comprising:
executing the first data file;
determining the first set of features of the first data file based on the execution of the first data file; and
executing the second data file; and
determining the first set of features of the second data file based on the execution of the second data file.

27. The method of claim 1, further comprising merging the third rule and the first rule to create a merged rule, wherein the application of the third rule comprises applying the merged rule to the first set of features of the second data file to determine the match by the third rule to the first set of features of the second data file.

28. The method of claim 1, further comprising:
merging the third rule and the first rule to create a merged rule;
monitoring network communications of at least one computing system;
extracting certain data files based on the monitoring of the network communications of the at least one computing system;
extracting a plurality of sets of features of each of the certain data files;
applying certain rules to the plurality of sets of features of each of the certain data files to determine a plurality of matches by the certain rules to the plurality of sets of features of the certain data files and a plurality of non-matches by the certain rules to the plurality of sets of features of the certain data files;
extracting for each of the certain data files a particular set of features of each of the certain data files;
applying the merged rule to the particular set of features of each of the certain data files to determine a plurality of matches by the merged rule to the particular set of features of the certain data files and a plurality of non-matches by the merged rule to the particular set of features of the certain data files;
comparing the plurality of matches by the merged rule to the particular set of features of the certain data files and the plurality of non-matches by the merged rule to the particular set of features of the certain data files to the plurality of matches by the certain rules to the plurality of sets of features of the certain data files and the plurality of non-matches by the certain rules to the plurality of sets of features of the certain data files to validate the merged rule; and
applying, based on the validation of the merged rule, the merged rule to the first set of features of the second data file to determine the match by the third rule to the first set of features of the second data file.

29. The method of claim 1, further comprising:
merging the third rule and the first rule to create a merged rule;
monitoring network communications of at least one computing system;
extracting certain data files based on the monitoring of the network communications of the at least one computing system;
applying certain rules to the certain data files to label a first set of the certain data files as matched and a second set of the certain data files as non-matched;
extracting for each of the certain data files a particular set of features of each of the certain data files;
applying the merged rule to the particular set of features of each of the certain data files to determine a plurality of matches by the merged rule to the particular set of features of the certain data files;
comparing the plurality of matches by the merged rule to the particular set of features of the certain data files to the first set of the certain data files labeled as matched to determine a true positive rate ("TPR");
comparing the plurality of matches by the merged rule to the particular set of features of the certain data files to the second set of the certain data files labeled as non-matched to determine a false positive rate ("FPR");
validating the merged rule at least based on the TPR and the FPR; and
applying, based on the validation of the merged rule, the merged rule to the first set of features of the second data file to determine the match by the third rule to the first set of features of the second data file.

30. The method of claim 1, further comprising:
merging the third rule and the first rule to create a merged rule;
monitoring network communications of at least one computing system;
extracting certain data files based on the monitoring of the network communications of the at least one computing system;
extracting a plurality of sets of features of each of the certain data files;
applying certain rules to the plurality of sets of features of each of the certain data files to determine a plurality of matches by the certain rules to the plurality of sets of features of the certain data files and a plurality of non-matches by the certain rules to the plurality of sets of features of the certain data files;
extracting for each of the certain data files a particular set of features of each of the certain data files;
applying the merged rule to the particular set of features of each of the certain data files to determine a plurality of matches by the merged rule to the particular set of features of the certain data files;
comparing the plurality of matches by the merged rule to the particular set of features of the certain data files to the plurality of matches by the certain rules to the plurality of sets of features of the certain data files and the plurality of non-matches by the certain rules to the plurality of sets of features of the certain data files to validate the merged rule; and
applying, based on the validation of the merged rule, the merged rule to the first set of features of the second data file to determine the match by the third rule to the first set of features of the second data file.

31. A method comprising:
monitoring network communications of at least one computing device;
extracting a first data file based on the monitoring of the network communications of the at least one computing device;
extracting at least a first set of features of the first data file and a second set of features of the first data file;
determining a particular non-match to the first set of features of the first data file;
determining a particular match to the second set of features of the first data file;
monitoring network communications of a particular computing device;
extracting a second data file based on the monitoring of the network communications of the particular computing device;
extracting at least a first set of features of the second data file;
determining a match to the first set of features of the second data file based at least on the first set of features of the first data file, the determination of the particular non-match, and the determination of the particular match; and
at least one of alerting regarding, reporting, disabling, blocking, or deleting the second data file via the particular computing device based on the determination of the match to the first set of features of the second data file.

32. The method of claim 31, further comprising:
establishing a classification process based at least on the first set of features of the first data file, the determination of the particular non-match to the first set of features of the first data file, and the determination of the particular match to the second set of features of the first data file; and
applying the classification process to the first set of features of the second data file to determine the match to the first set of features of the second data file.

33. The method of claim 32, further comprising:
extracting particular data files based on the monitoring of the network communications of the at least one computing device;
extracting a plurality of sets of features of each of the particular data files;
determining particular matches to the plurality of sets of features of the particular data files and particular non-matches to the plurality of sets of features of the particular data files;
extracting for each of the particular data files a particular set of features of each of the particular data files;
determining a plurality of matches by the classification process to the particular set of features of the particular data files and a plurality of non-matches by the classification process to the particular set of features of the particular data files;
comparing the plurality of matches by the classification process to the particular set of features of the particular data files and the plurality of non-matches by the classification process to the particular set of features of the particular data files to the particular matches to the plurality of sets of features of the particular data files and the particular non-matches to the plurality of sets of features of the particular data files to validate the classification process; and
applying the classification process to the first set of features of the second data file to determine the match to the first set of features of the second data file at least based on the validation of the classification process.

34. The method of claim 33, wherein the classification process comprises applying at least one rule.

35. A method comprising:
monitoring network communications of at least one computing device;
extracting a first data file based on the monitoring of the network communications of the at least one computing device;
extracting at least a first set of features of the first data file and a second set of features of the first data file;
applying a first rule to the first set of features of the first data file to determine a non-match by the first rule to the first set of features of the first data file;
applying a second rule to the second set of features of the first data file to determine a match by the second rule to the second set of features of the first data file;
generating a third rule based at least on the first set of features of the first data file, the determination of the non-match by the first rule to the first set of features of the first data file, and the determination of the match by the second rule to the second set of features of the first data file;
merging the third rule and the first rule to create a merged rule;
monitoring network communications of a particular computing device;
extracting a second data file based on the monitoring of the network communications of the particular computing device;
extracting at least a first set of features of the second data file;

applying the merged rule to the first set of features of the second data file to determine a match by the merged rule to the first set of features of the second data file; and at least one of disabling, blocking, or deleting the second data file via the particular computing device based on the determination of the match by the merged rule to the first set of features of the second data file.

36. The method of claim 35, further comprising:
extracting particular data files based on the monitoring of the at least one computing device;
extracting a plurality of sets of features of each of the particular data files;
applying particular rules to the plurality of sets of features of each of the particular data files to determine a plurality of matches by the particular rules to the plurality of sets of features of the particular data files and a plurality of non-matches by the particular rules to the plurality of sets of features of the particular data files;
extracting for each of the particular data files a particular set of features of each of the particular data files;
applying the third rule to the particular set of features of each of the particular data files to determine a plurality of matches by the third rule to the particular set of features of the particular data files;
comparing the plurality of matches by the third rule to the particular set of features of the particular data files to the plurality of matches by the particular rules to the plurality of sets of features of the particular data files and the plurality of non-matches by the particular rules to the plurality of sets of features of the particular data files to validate the third rule; and
merging the third rule to the first rule at least based on the validation of the third rule.

37. The method of claim 36, further comprising:
monitoring network communications of at least one computing system;
extracting certain data files based on the monitoring of the network communications of the at least one computing system;
extracting a plurality of sets of features of each of the certain data files;
applying certain rules to the plurality of sets of features of each of the certain data files to determine a plurality of matches by the certain rules to the plurality of sets of features of the certain data files and a plurality of non-matches by the certain rules to the plurality of sets of features of the certain data files;
extracting for each of the certain data files a particular set of features of each of the certain data files;
applying the merged rule to the particular set of features of each of the certain data files to determine a plurality of matches by the merged rule to the particular set of features of the certain data files and a plurality of non-matches by the merged rule to the particular set of features of the certain data files;
comparing the plurality of matches by the merged rule to the particular set of features of the certain data files and the plurality of non-matches by the merged rule to the particular set of features of the certain data files to the plurality of matches by the certain rules to the plurality of sets of features of the certain data files and the plurality of non-matches by the certain rules to the plurality of sets of features of the certain data files to validate the merged rule; and applying the merged rule to the first set of features of the second data file to determine the match by the merged rule to the first set of features of the second data file based on the validation of the merged rule.

38. The method of claim 35, further comprising:
extracting particular data files based on the monitoring of the at least one computing device;
labeling a first set of the particular data files as matched and a second set of the particular data files as non-matched;
extracting for each of the particular data files a particular set of features of each of the particular data files;
applying the third rule to the particular set of features of each of the particular data files to determine a plurality of matches by the third rule to the particular set of features of the particular data files;
comparing the plurality of matches by the third rule to the particular set of features of the particular data files to the first set of the particular data files labeled as matched to determine a first true positive rate ("TPR");
comparing the plurality of matches by the third rule to the particular set of features of the particular data files to the second set of the particular data files labeled as non-matched to determine a first false positive rate ("FPR");
validating the third rule at least based on the first TPR and the first FPR; and
merging the third rule to the first rule at least based on the validation of the third rule.

39. The method of claim 38, further comprising:
monitoring network communications of at least one computing system;
extracting certain data files based on the monitoring of the network communications of the at least one computing system;
labeling a first set of the certain data files as matched and a second set of the certain data files as non-matched;
extracting for each of the certain data files a particular set of features of each of the certain data files;
applying the merged rule to the particular set of features of each of the certain data files to determine a plurality of matches by the merged rule to the particular set of features of the certain data files;
comparing the plurality of matches by the merged rule to the particular set of features of the certain data files to the first set of the certain data files labeled as matched to determine a second true positive rate ("TPR");
comparing the plurality of matches by the merged rule to the particular set of features of the certain data files to the second set of the certain data files labeled as non-matched to determine a second false positive rate ("FPR");
validating the merged rule at least based on the second TPR and the second FPR; and
applying the merged rule to the first set of features of the second data file to determine the match by the merged rule to the first set of features of the second data file at least based on the validation of the merged rule.

40. A non-transitory computer readable storage medium having computer-executable instructions that when executed cause one or more processors to perform operations comprising:
monitoring network communications of at least one computing device;
extracting a first data file based on the monitoring of the network communications of the at least one computing device;

extracting at least a first set of features of the first data file and a second set of features of the first data file;

applying a first rule to the first set of features of the first data file to determine a non-match by the first rule to the first set of features of the first data file;

applying a second rule to the second set of features of the first data file to determine a match by the second rule to the second set of features of the first data file;

generating a third rule based at least on the first set of features of the first data file, the determination of the non-match by the first rule to the first set of features of the first data file, and the determination of the match by the second rule to the second set of features of the first data file;

monitoring network communications of a particular computing device;

extracting a second data file based on the monitoring of the network communications of the particular computing device;

extracting at least a first set of features of the second data file;

applying the third rule to the first set of features of the second data file to determine a match by the third rule to the first set of features of the second data file; and at least one of disabling, blocking, or deleting the second data file via the particular computing device based on the determination of the match by the third rule to the first set of features of the second data file.

41. A network-enabled threat mitigation system comprising:

a first computing system configured for:

monitoring network communications of at least one computing device;

extracting a first data file based on the monitoring of the network communications of the at least one computing device;

extracting at least a first set of features of the first data file and a second set of features of the first data file;

applying a first rule to the first set of features of the first data file to determine a non-match by the first rule to the first set of features of the first data file;

applying a second rule to the second set of features of the first data file to determine a match by the second rule to the second set of features of the first data file;

generating a third rule based at least on the first set of features of the first data file, the determination of the non-match by the first rule to the first set of features of the first data file, and the determination of the match by the second rule to the second set of features of the first data file; and transmitting the third rule; and a second computing system configured for:

receiving the third rule from the first computing system;

monitoring network communications of the second computing system;

extracting a second data file based on the monitoring of the network communications of the second computing system;

extracting at least a first set of features of the second data file;

applying the third rule to the first set of features of the second data file to determine a match by the third rule to the first set of features of the second data file; and at least one of disabling, blocking, or deleting the second data file based on the determination of the match by the third rule to the first set of features of the second data file.

* * * * *